United States Patent
Sonnenfeld

(10) Patent No.: US 6,418,298 B1
(45) Date of Patent: *Jul. 9, 2002

(54) COMPUTER NETWORK BASED TESTING SYSTEM

(75) Inventor: Bruce Sonnenfeld, Key West, FL (US)

(73) Assignee: The Riverside Publishing Co., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/599,937

(22) Filed: Jun. 22, 2000

Related U.S. Application Data

(63) Continuation of application No. 08/955,133, filed on Oct. 21, 1997, now Pat. No. 6,112,049.

(51) Int. Cl.$^7$ ................................................. G09B 3/00
(52) U.S. Cl. ...................... 434/350; 434/322; 434/323; 434/118
(58) Field of Search ................................ 434/350, 322, 434/323, 118, 362; 706/927

(56) References Cited

U.S. PATENT DOCUMENTS

| | | |
|---|---|---|
| 3,654,708 A | 4/1972 | Brudner |
| 4,486,180 A | 12/1984 | Riley |
| 4,671,772 A | 6/1987 | Slade et al. |
| 4,764,120 A | 8/1988 | Griffin et al. |

(List continued on next page.)

*Primary Examiner*—Joe H. Cheng
*Assistant Examiner*—Chanda Harris
(74) *Attorney, Agent, or Firm*—Wolf, Greenfield & Sacks, P.C.

(57) ABSTRACT

An interactive query server system, comprising a database storing a plurality of query sections, each section including parameters defining a relation with other query sections. The query server is adapted to:

Figure 1:
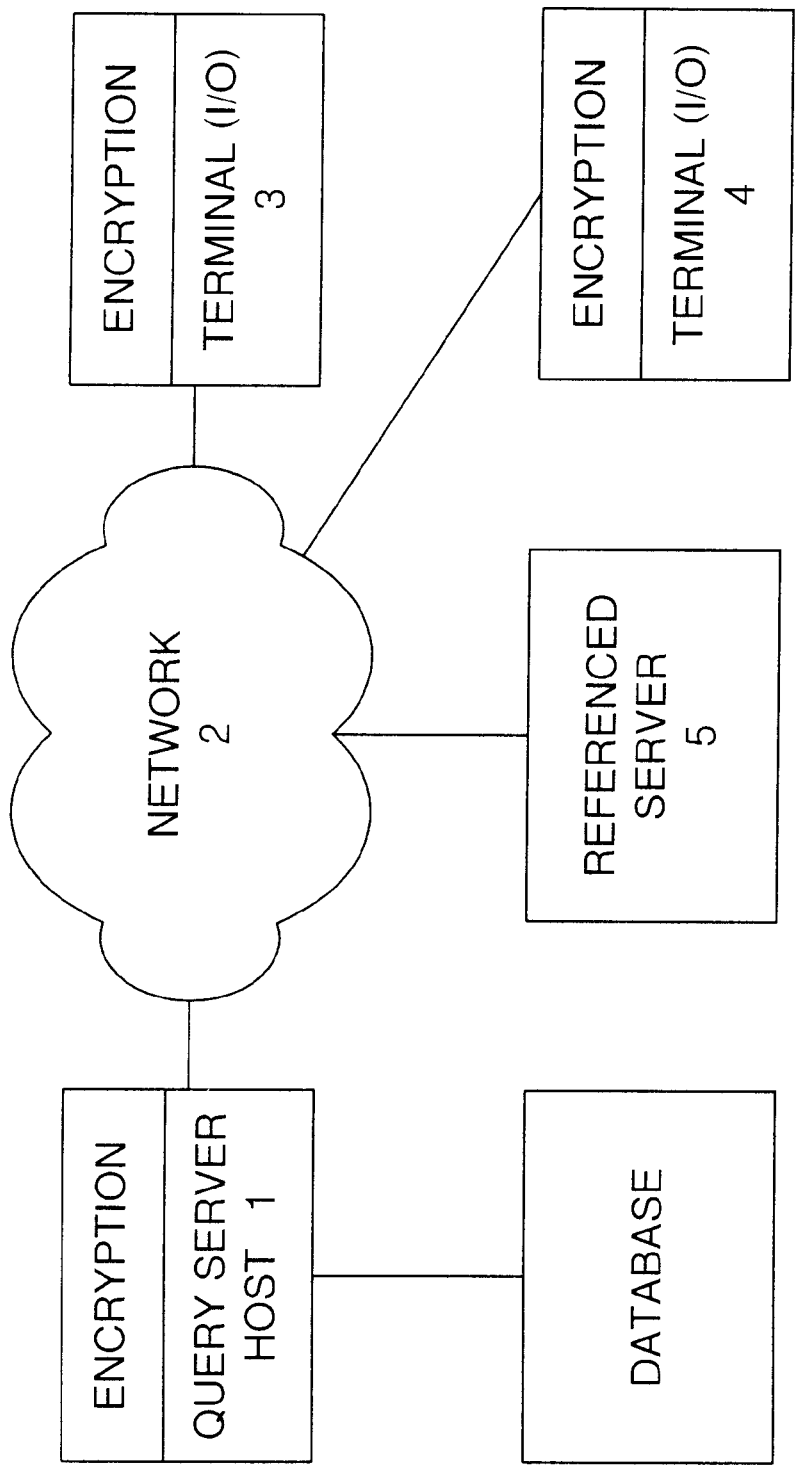

Generate, based on the parameters, query sequence sets, each set having at least one query section;

Transmit a query sequence set as a logical unit to a client system;

Receive responses of a user to the query sequence set from the client system; and Process the received responses to produce an output.

The host may transmit information defining at least one of the sections to the client system, which are presented to the user for receipt of responses. The responses are then transmitted to the query server. The query server processes the received information and produces an output based on the processed information. The query server may transmit information defining one of the sections to the client system, including designated queries and context information, and define information representative of a state of the section before transmission. The terminal presents inquiries to the user defined by the section, receives responses to the queries, and transmits an answer that includes information relating to the responses and a modified state to the query server. The query server, in this case, processes the responses to determine an information content and to determine a change between the defined state and the modified state.

1 Claim, 1 Drawing Sheet

U.S. PATENT DOCUMENTS

| | | |
|---|---|---|
| 4,793,813 A | 12/1988 | Bitzer et al. |
| 4,798,543 A | 1/1989 | Spiece |
| 4,877,408 A | 10/1989 | Hartsfield |
| 4,895,518 A | 1/1990 | Arnold et al. |
| 4,978,305 A | 12/1990 | Kraft |
| 5,002,491 A | 3/1991 | Abrahanson et al. |
| 5,011,413 A | 4/1991 | Ferris et al. |
| 5,059,127 A | 10/1991 | Lewis et al. |
| 5,170,362 A | 12/1992 | Greenberg et al. |
| 5,176,520 A | 1/1993 | Hamilton |
| 5,180,309 A | 1/1993 | Egnor |
| 5,195,033 A | 3/1993 | Samph et al. |
| 5,204,813 A | 4/1993 | Samph et al. |
| 5,211,563 A | 5/1993 | Haga et al. |
| 5,211,564 A | 5/1993 | Martinez et al. |
| 5,259,766 A | 11/1993 | Sack et al. |
| 5,261,823 A | 11/1993 | Kurokawa |
| 5,334,326 A | 8/1994 | Bostick |
| 5,372,507 A | 12/1994 | Goleh |
| 5,433,615 A | 7/1995 | Clark |
| 5,437,553 A | 8/1995 | Collins et al. |
| 5,437,555 A | 8/1995 | Ziv-el |
| 5,441,415 A | 8/1995 | Lee et al. |
| 5,496,175 A | 3/1996 | Oyama et al. |
| 5,513,994 A | 5/1996 | Kershaw et al. |
| 5,545,044 A | 8/1996 | Collins et al. |
| 5,565,316 A | 10/1996 | Kershaw et al. |
| 5,577,919 A | 11/1996 | Collins et al. |
| 5,597,312 A | 1/1997 | Bloom et al. |
| 5,618,182 A | 4/1997 | Thomas |
| 5,657,256 A | 8/1997 | Swanson et al. |
| 5,727,950 A | 3/1998 | Cook et al. |
| 5,743,743 A | 4/1998 | Ho et al. |
| 5,813,863 A | 9/1998 | Sloane et al. |
| 5,879,165 A | 3/1999 | Brunkow et al. |
| 5,947,747 A | 9/1999 | Walker et al. |
| 6,112,049 A * | 8/2000 | Sonnenfeld ............. 434/350 X |
| 6,162,060 A * | 12/2000 | Richard et al. ......... 434/118 X |
| 6,259,890 B1 * | 7/2001 | Driscoll ................. 434/350 X |

* cited by examiner

COMPUTER NETWORK BASED TESTING SYSTEM

This application is a continuation of Ser. No. 08/955,133 filed Oct. 21, 1997 now U.S. Pat. No. 6,112,049.

FIELD OF THE INVENTION

The present invention relates to the field of electronic testing, and more particularly to a method and system for designing, administering and taking tests through a computer network or other information distribution media.

BACKGROUND OF THE INVENTION

Tests of human knowledge, understanding and preferences are well known. In educational environments, they are typically used as indicators for measuring human performance and our knowledge. Test results-may be used, for example, to screen job applicants, assign grades to students and to gain insight about human abilities, strengths and weaknesses.

A number of computerized query systems are known, including certain educational testing systems, on-line surveys, client-server systems, search engines, Internet, intranet and World Wide Web-based systems, educational toys, and the like.

Typically, these systems allow a test administrator to define the queries, testing parameters and response parameters. Some of these systems may also allow randomization of queries and adaptive testing.

Often, the test or query may be considered a logical unit, with a plurality of requested information components. The structure is typically defined at the top level, i.e., the test definition logical structure is defined unitarily. This leads to difficulties in altering the structure of the test, as it is difficult to define different local parameters for some of the questions in such a structure. Further, this makes test component reuse difficult, as the testing parameters need be included with the sub-component, a function not typically supported in known systems. Therefore, while test content may be portable, test structure must usually be redefined for each version or iteration. This structure also makes optimization of overall test structure difficult, as global parameters are typically a compromise from desired parameters for individual portions of a test.

Prior electronic testing and instructional systems are disclosed in U.S. Pat. Nos. 5,657,256; 5,618,182; 5,597,312; 5,577,919; 5,565,316; 5,545,044; 5,513,994; 5,496,175; 5,441,415; 5,437,555; 5,437,553; 5,433,615; 5,372,507; 5,334,326; 5,261,823; 5,259,766; 5,211,564; 5,211,563; 5,204,813; 5,195,033; 5,180,309; 5,176,520; 5,170,362; 5,059,127; 5,011,413; 5,002,491; 4,978,305; 4,895,518; 4,798,543; 4,877,408; 4,793,813; 4,764,120; 4,671,772; 4,486,180; and 3,654,708, each of which is expressly incorporated herein by reference in its entirety.

SUMMARY OF THE INVENTION

The system and method according to the present invention provides an automated testing system allowing design and administration of hierarchical testing scheme. This scheme eases the burden of creating and giving out tests, and allows a fine grain of control over testing parameters. This degree of control is optional, and therefore the construction of a test is not made unnecessarily complex. In fact, in a preferred embodiment, parameters from one portion of a test or from a separate test are readily copied or linked to another portion or test. Therefore, the test designer has the ability to focus on the quality and content of the tests and reliability of the test results, while avoiding redundant tasks.

The present invention overcomes the difficulties of the prior art by providing logical units (i.e., "building blocks") within an overall presented information stimulus, volitional response system. These building blocks can be grouped together in various sequences to create a question and answer response system. Each building block is independent of the others and contains parameters that determine its functionality and implementation. Each building block also contains information about how it relates to the other building blocks. Some systems that can be constructed from these building blocks include educational tests, quizzes, surveys, questionnaires and trivia quizzes. However, any other system that can be formulated as a sequence of questions and answers can also be built from these building blocks (i.e., scientific experiments). Each logical unit or "section" (also known as 'building block') has a set of parameters which define, for example, an interrelation of that section with other sections; grading instructions; adaptive aspects; allowable timing, sequencing and repetition; security; and randomization. Thus, the overall test structure is not required to define these aspects for each section of the test. This allows a fine level of granularity in defining the overall testing function, while allowing optimization of individual sections, easing reuse of sections in other tests while maintaining the testing parameters, and assisting in the incremental formulation of a test structure.

A section consists of one or more elements, being subject to the common parameter set. The element, in turn, may include any number of questions, i.e., zero or more. One or more sections may be grouped into a logical display set, termed a "part".

The test part, for example, is transmitted as a single logical unit from a server, which assembles each section, as necessary, based on the parameters, and then groups the sections, based on other parameters, as a part. The server then awaits receipt of responses, which are in a form defined by the section parameters, and interprets the responses in accordance with the section parameters, for output. The output may be subject to further analysis, such as individual and group statistics, feedback to the test taker, or the like. In this case, the server is not burdened with continual monitoring of each user, and thus may serve a large number of test takers simultaneously, without overload. The server is a transactional based device, servicing each test taker as needed to register, transmit a test part, and receive results.

Because each test section includes its own local parameters, a wide variety of data types may be included in a section, without requiring the test structure as a whole to be unnecessarily complex. For example, Hypertext markup Language (HTML) 3.0 is presently preferred to define the display of each section, which is collected for each section into a Web page as the part. As such, full data type integration, hyper-linking, and display formatting are supported. For example, this allows a section to include a pointer to a file containing a video clip, which is downloaded from a different Web server. This use of an open hyper-linking protocol, such as HTML 3.0, to define the presentation in a testing environment is new, and provides significant advantages, including the ability to reference data which may change continuously or at variable times.

By employing a standard language such as HTML, the system is operable over intranets or the Internet using standard Web browsers, such as Microsoft Internet Explorer (MSIE), e.g., MSIE 3.02, Netscape Navigator, e.g., Navigator 4.01, or the like, on standard client computing platforms. However, WebTV® or an Internet appliance, such as Internet capable personal communication service (PCS) devices may also administer tests. Thus, the benefits of the present invention are possible using standard server and client systems, with a custom Web server (or other "Test" server) to generate test parts and receive responses, and the system does not necessarily require customized hardware. Of course, the system need not be open, and proprietary hardware, protocols and software may be employed. The system is also extensible and not necessarily linked to HTML 3.0, and thus may employ other or future communication or presentation standards, as desired or as they become available.

Since a preferred embodiment of the present invention operates using standard Web browsers over the Internet, a section or part of a test may comprise:

A browser plug-in

TCP/IP socket applications running on the client

JAVA applets or ActiveX objects

Any other systems that enhance the client functionality beyond existing HTML functionality The presented content may include audio, video, multimedia, or other information. Because the test taker typically employs a general-purpose computer as the platform, other facilities of the platform may be employed to assist the test taker. Thus, the resources on the computer (such as a calculator) and the Internet (such as other web pages) may be used to aid the test taker in taking the test.

It is noted that it may also be desired to seek to prevent a user from viewing or receiving information other than that provided by the test designer. This may be effected, for example, by providing a closed software application that prevents the user from employing the full capabilities of the client computer. A video camera, for example ITU H.323 videoconferencing or still image format such as JPEG or GIF, and screen content monitor application may also be provided to proctor the test. The student keyboard may also be monitored for suspicious activity or hiatuses in activity.

It is noted that, while a preferred embodiment of the present invention allows multiple remote users (clients) to interact with a central query server (host), the system may, in fact, be constituted for a single user on a non-networked computer system. In this case, the client and host systems are separated by a distinction in tasks, the client system being primarily directed to human user interface tasks and the host being directed to database and application processing tasks.

Therefore, the system provides a database of the elemental sections ('building blocks') of the test, each including a content portion and a set of parameters. The sections are assembled into a logical unit by an application program, which may be a part of the database retrieval system, a distinct host or client system which receives the section information from a host. The logical unit is transmitted to a client for presentation and interaction with the user. The client may include enhanced functionality defined by the logical unit, but outside the scope of the transmission. The client obtains information relating to the sections from the user or through interaction with the user, and transmits results or responses back to the server, for analysis. The server may then transmit another logical unit to the client, which may have no defined relation to the prior logical unit, or have a logical relation defined by the parameters or global test parameters. It is noted that the host or server and client may be merged into a single physical apparatus, or be distinct and communicate through a communication medium.

In a preferred embodiment, the client processes the user responses and delivers the entirety of the responses to the server at one time; however, this is not a limitation of the system as a whole. In order to free the server for various activities, without storage of interim results, each part of the test may thus include prior results. Therefore, the test need only be submitted once for grading. In order to prevent tampering with answers where the answer is already submitted (but not entered), a code may be transmitted with the test part that indicates a status of the prior results. Any change in these prior results by, for example, manual change or error in transmission will result in an indication of tampering. In order to reduce the possibility of data transmission errors, an error correction and detection code (EDC) may be provided.

The query need not be of an academic or demographic nature, and therefore the more general aspect of the system seeks to determine a human response to a stimulus. This stimulus is described by a record in a database, which also includes parameters, which may be intrinsic, defining the content, extrinsic, defining a relation of the record to other records, or hybrid, defining the content based on references to external elements. The content portion, in turn, may also have internal or external references, although these references are not necessarily processed at the server level, and may be passed to the client for direct communication with the source (server) of the external reference. The user, interacting with the client, experiences the stimulus, and a response recorded. As noted, the stimulus need not be explicitly defined in the content of the server-based database, but rather may be referenced by that database. Typically, the response is manually recorded, but automated data acquisition systems may also be used. While the system is open to broad classes of stimuli and responses, in a preferred embodiment, the stimulus is a text or multimedia presentation supported by a desktop computer with communication link, and the response is gathered through a graphic user interface from a human user.

The responses may be, for example, in the form of multiple choice answers, buttons, check boxes or dialog boxes, or may be sliders, image maps, or other types of "continuous" response inputs. Typically, the user interacts with a graphic user interface, and thus a pointing device input and keyboard may be employed to define the response. The stimulus is typically graphic or semantic information displayed on a screen.

The present invention may be differentiated from known systems in that sections of a query ('building blocks') may have individual sets of parameters, allowing a fine granulation of control. The present invention may also be differentiated from known systems in that the query is delivered to the respondent in a form that may include internal and/or external references to content.

In a preferred embodiment, the present system allows for the interactive and secure development and production of tests over the Internet using a standard web browser. This program can be used along with any standard ODBC compliant database and any standard web browser that supports the HTTP protocol. The server stores various statistics and other information about the test, the takers of the test and the questions on the test.

The system gives the test developer the freedom to concentrate on creating the test and the content of the test rather than worrying about the way the test is going to be given and how it is going to be produced. The way the test is going to be given and produced are optimized and standardized by the system and method according to the present invention, which automates the test presentation. The system sets an environment where interesting and unique kinds of tests can be given in a dynamic medium. This includes the ability to give multimedia-based questions that consist of video clips, sound and pictures. It also includes the ability to use the resources on the computer (such as a calculator) and the Internet (such as other web pages) to aid the test taker in taking the test.

The "Interactive Testing System" ("ITS") uses the following, conceptual hierarchical model:
Test Administrator(s)→Test Designer(s)→Test(s)→Section(s)→Question(s)→Choice(s)
Test Administrators→Test Taker(s)
Test Designer(s)→Test Taker(s)
Test Part: Section→[Optional Break]→Section→[Optional Break] . . .

The ITS system provides the following features:
Allows for multiple test designers to design any number of their own password-protected tests
Allows each test designer to develop any number of tests
Allows each test to have zero or more sections on it (i.e., zero or more test parts)
Allows each section to have zero or more questions in it
Allows for a test to be divided into parts and restricts the number of "visits" to those parts
Allows for the computation of how much cumulative time has been spent on different parts of a test
Allows multiple sections to be given on the same test part
Allows for breaks to be given during the test
Allows for the analysis of questions and answers to see how many people chose one response over another
Gives tests securely, automatically and accurately:
Checks for test tampering
Disallows "reloading" of prior test parts by using the "reload" button on a standard web browser
Automatically gives and grades test. Automatic grading saves hours of potential work.
Records various statistics about a test
Allows for the questions within a section to be:
    Asked in random order
    Asked in sequential order
    Asked a certain number of times (i.e., ask ten questions on this section)
    Multiple choice, one answer
    Multiple choice, one correct answer questions
    Multiple choice, one or more correct answer questions
    Multiple choice, zero or more correct answers questions
    Fill-In-The-Blank questions
Allows test takers to:
    View test results (number right, wrong or no answer; scores: average, low, high)
    Compare how they did to the test median and standard deviation as well as the test mean, low score and high score
    See what answers they put to the questions and view explanations to wrong answers
Allows for the development of "Regular" tests and "Progressive" (also known as "Adaptive") tests where "Progressive" tests get harder or easier depending on how the user did on the last test
Allows for the development of "Regular" sections and "Progressive" sections within a test
Penalizes for "guessed" answers to questions
Allows for scores to be given within a range of scores. Scores can be in "inverted" order where higher scores are given to more incorrect answers ("negative reward". . . you must get all the answers wrong to get the best possible test score)
Allows sections of a test to be copied to other tests
Allows questions in a test section to be copied to other sections on different tests
Records test designer information:
    Name
    Logon Identifier
    Password
    Address, City, State, Zip code and Phone Number
    Fax Number
    Email Address
Records test information:
    Unique Test Identifier
    Whether to give sections on a test in random order
    Minimum number of sections to give on test
    Maximum number of sections to give on test
    The lowest score to be given on a test
    The highest score to be given on a test
    The passing score for a test
    A URL to go to if the test is passed
    A URL to go to if the test is failed
    Whether to show answers and explanations to the questions upon test completion
Records section information:
    The section order # within test (can be the same as another section in which case one of the sections will be selected at random)
    The section heading (also known as the section identifier, label or name)
    The section introduction
    The section ending
    The section weight relative to 1.0
    The number of questions within the section
    The minimum number of questions to ask (within difficulty level if any) on the section
    The maximum number of questions to ask (within difficulty level if any) on the section
Whether to ask questions in random or sequential order
What order to ask questions within the section in
    At one particular difficulty level
    By increasing difficulty level
    By decreasing difficulty level
    By random difficulty level
    By Ignoring the difficulty level
What order to ask questions within a difficulty level (if not ignoring difficulty level):
    Random
    Sequential (order entered)
    The maximum amount of time that a person can work on a section
    The minimum amount of time that a person must work on a section
    Whether to given the next section along with the current section or in a different part on the test
    The maximum amount of time to pause (if any) after a section has been given
    The minimum amount of time to pause (if any) after a section has been given
    The passing section score, low section score and high section score (for 'Progressive' tests)
    The next section order number to go to if get greater than, less than or equal to the passing section score Records question information:
  The question to ask (can include HIML code)
  The explanation for the question (can include HTML code)
  The question order number within the section
  Question difficulty level
  The number of points for getting the question right, wrong or not putting an answer to the question
  Whether to give the choices for a question in random order or sequential order
  The actual choices to the question to be displayed (for multiple choice)
Records test taker information:
  Name
  Logon Identifier
  Password
  Address Information
  Phone number
  Fax number
  Email address
  Maximum number of tests allowed to take total
  Skeleton file used when taker logs on to take the test
Type of test taker:
  Regular
Template for other users
  Permissions:
    What test taker is allowed to do when they log on to see test results
    View fields above
    Modify fields above
    What happens when a test taker logs on to take a test:
    Fields above are required to be entered by taker
    Fields above are verified with matching entries in database
    Fields above will replace current information in the database
    Who is allowed to take which tests how many times and between which dates
  Logging:
    What level of results to record for a test taker:
      Test
      Section
      Questions
Records test statistics:
  Number of times test has been given
  Number of times test has been graded
  Number of times test has been passed/failed
  Scores:
    Average, Total, Maximum, Minimum, Mean, Median, Standard Deviation
  Test Duration:
    Average, Total, Maximum, Minimum, Mean, Median, Standard Deviation
  Number Of Times Test Has Been Taken:
    Average, Total, Maximum, Minimum, Mean, Median, Standard Deviation
Records test section statistics:
  Number of times section has been asked
  Number of times section has been graded
  Section Duration:
    Average, Total, Maximum, Minimum, Mean, Median, Standard Deviation
  Section Visits:
    Average, Total, Maximum, Minimum; Mean, Median, Standard Deviation
Records question statistics:
  Number of times question has been asked or graded
  Number of times question has been answered correctly, incorrectly or not answered
Records test taker statistics and results:
  "Payback" any test that a user has taken
    a Records grades, answers to questions, number of times they have taken the test
  Allows taker to see how they did compared to other users
  Records the amount of time a user has spent on each part of the test
  Records the date and time a user takes the test out on
Allows test designers to:
Maintain a list of private test takers:
  Create
  Modify
  Delete
  Email
  Cancel tests outstanding (i.e., previously given out)
  Assign test takers (created by designer or administrator) to take tests created
  Give out tests to individual users that they create
Allows test database administrator to:
  Become ANY test designer and perform ALL functions associated with that test designer
  Maintain designer accounts:
    Create
    Modify
    Delete
    Email designer
    View test database statistics:
      Total number of tests given, graded, passed
      Total number of questions given, graded, passed
    Cancel ANY outstanding tests being given out by any designer
    Create "Global" users who are able to take ANY test developed by ANY designer
    Allows test designer to control exactly what test taker views when taking a test The ITS allows a person to interactively create and give out tests securely on the Internet using a standard web browser interface. The use of the ITS can be broken into the following areas of functionality:
  1 • Test Design and Development
  2 • Test Taking ("Using The Test")
  3 • Statistics, Reports and Analysis of Test Results The steps necessary to design and develop a test can be broken down as follows:
  1 • Test Planning and Preparation
  2 • Test Designer Information
  3 • Test Information
  4 • Sections For Test Information
  5 • Questions On A Section The ITS can be used as a tool to provide instruction and give out tests on the Internet. It does so by implementing a "Test-Centric" academic environment. This is a form of learning where the test is at the heart of providing the content. The test becomes the focal point for the lesson and the questions on the test point to areas on the web where the answer to the questions can be learned about.

This "Test-Centered" approach gives the test taker more freedom in deciding how they want to learn. If they already know the answer to a question, they can skip the instructional portion and go on with the other questions. If they don't know the answer, they can link to information on the topic in another area of the web.

The ITS system therefore allows a test designer to:
- Produce tests with multiple-parts, one part or a random number of parts
- Create tests with time limits (including timed pauses between parts)
- Give out the sections of a test in any order (even in random order)
- Make tests with a fixed number of sections or a random number of sections
- Produce tests with different questions for different takers
- Limit who can take your test by password protecting your tests by taker
- Re-use parts of tests in other tests
- Decide whether to show answers after taking a test
- Send test 'web' instructions along with your test This, in turn, allows the designer to gain complete control of your questions, answers and grading, to:
- Create multiple choice questions (one answer correct or zero-or-more answers correct)
- Design fill-in-the-blank questions
- Assign point values to questions for correct answers, wrong answers, or no answers
- Ask questions in any order . . . fixed or random
- Choose questions randomly from a pool of questions
- Ask a fixed set of questions
- Re-use questions and answers from previously designed tests
- Give choices to questions in a random order
- Deduct points for questions that were guessed
- Scale test scores to be within any range
- Allow test takers to view test statistics immediately (see the "bell shaped curve")
- Give web links for explanations of answers or missed questions The ITS system also maintains vital test statistics, such as:
- Know who took your test, when they took it, what they got right (or wrong) and how many times they took it
- Compute the total number of times your test was given
- See what questions were missed or correctly answered the most or least
- Analyze the effectiveness of tests by computing grades without grading
- Find out how many students in your class are having problems with certain questions
- Monitor progress of individual test takers over the course of years of testing.

The ITS system has various reporting formats, including:
- Automatically generate notes to test takers (students, job applicants, . . . )
- Generate notes and periodical report cards home to parents
- Give feedback to upper management about how people have done in the past Because, in a preferred embodiment, the ITS system resides on the Internet, the system allows the test designer and test taker to take advantage of the Internet resources to create new tests, for example, to:
- Show answers to questions with explanations on the web
- Give questions based on the content of another web site
- Show video clips or play sound files for "multi-media" questions
- Give instructions using web pages Other advantages of the automated ITS system include:
- No need to grade exams manually
- Allows more time for teaching and less time copying tests for students
- Can utilize Internet resources for students to do research
- Ability to monitor your test takers to gain immediate feedback and assist if need be
- Permanent record of past performance kept. See how students and test taker have progressed over the years.

The ITS system also provides a number of security features, including:
- Allowing the test designer to decide who can take your test(s), the number of times they can take them and when they can take them.
- Password-protection of tests to disallow them from being viewed by others when they are designed.
- Tampering with tests is not allowed (answers may be checked to ensure that they aren't changed).

It is therefore an object of the invention to provide a human response testing system, comprising a host, storing a plurality of testing parameters, the testing parameters being divided into a plurality of sections; and a terminal, communicating with the host through a communication system, adapted for interaction with the human to acquire responses, wherein the host transmits information defining at least one of the sections to the terminal, the terminal presents inquiries to the human defined by the section for receipt of responses, and the terminal transmits information relating to the responses to the host; and wherein the host processes the information relating to the responses to inquiries defined by the section and outputs the processed information from the host.

It is another object according to the invention to provide a human response testing system, comprising a host, storing a plurality of testing parameters, the testing parameters being divided into a plurality of sections; and a terminal, communicating with the host through a telecommunications link, adapted for interaction with the human to acquire responses, wherein the host transmits information defining one of the sections to the terminal, including designated queries and context information, and defines information representative of a state of the section before transmission, the terminal presents inquiries to the human defined by the section for receipt of responses to the queries, and the terminal transmits an answer including information relating to the responses and a modified state to the host, the host processing the responses to determine an information content and determining a change between the defined state and the modified state to indicate changes between the transmitted context information and the information relating to the responses.

It is a still further object according to the invention to provide an interactive query server system, comprising a database storing a plurality of query sections, each section including parameters defining an graphic layout, the graphic layout defining display elements from a plurality of separately stored data records, the query server being adapted to generate, based on the parameters, query sequence sets, each set having at least one query section; transmit a query sequence set as a logical unit to a client system; receive responses of a user to the query sequence set from the client system; and process the received responses to produce an output.

It is also an object according to the present invention to provide an interactive query server system, comprising a database storing a plurality of query sections, each section including parameters defining a relation with other query sections, the query server being adapted to generate, based on the parameters, query sequence sets, each set having at least one query section; transmit a query sequence set as a logical unit to a client system; receive responses of a user to the query sequence set from the client system; and process the received responses to produce an output.

According to an object of the invention, the host may transmit information defining at least one of the sections to the client system, the client system presents inquiries to the user defined by the section for receipt of responses, and the client system transmits information relating to the responses to the query server; and wherein the query server processes the information relating to the responses to inquiries defined by the section and outputs the processed information from the query server. The query server may transmit information defining one of the sections to the client system, including designated queries and context information, and defines information representative of a state of the section before transmission, the terminal presents inquiries to the user defined by the section for receipt of responses to the queries, and the client system transmits an answer including information relating to the responses and a modified state to the query server, the query server processing the responses to determine an information content and determining a change between the defined state and the modified state to indicate changes between the transmitted context information and the information relating to the responses. The query server and the client system may be separate systems communicating over a telecommunications network (e.g., local area network, wide area network, intranet, Internet, wireless data communication network), or located on the same physical hardware. The communication may be open or encrypted, and the client software may be open (compatible with a large number of third party hardware and software products) or closed (limited in operation to a particular environment or type of environment)

According to another object of the present invention, the query server formats a test as an HTML document, which may be, for example, read and responded to through a so-called web browser. The query sequence may include plain text, references to objects on the query server, references to objects on the client, or references to objects on external servers. These objects may be, for example, text, graphics, video (e.g., compressed video, such as MPEG, QuickTime or AVI), audio, multimedia, or control signals for hardware devices. While a standard computing platform is a preferred client system, the display device may also be a video receiver It is a further object of the invention according to a preferred embodiment to service a plurality of clients with a single query server.

It is another object according to the present invention to provide a system in which the query sequence set comprises query content and parameters for processing of the query content. The query server, after receiving responses of the user to the query sequence set from the client system, may transmit a second query sequence set. The processing parameters for the first query sequence set may differ from the processing parameters for the second query sequence set. According to one embodiment, the user responses to test parts are cumulative, so that the query server need only record the test responses once. An encoded message may be provided in each test part to indicate unwarranted changes made to a previously submitted part, thereby allowing answers to be effectively locked. The encoded message may be a parity check, cyclic redundancy check, or other known encoding scheme.

The query server may perform a statistical analysis of the received response(s), and may also perform chronological measurements of the received responses. The query server may also produce the query sequence sets "on demand", i.e., formulate them at the time of transmission. This allows adaptive and random order tests to be administered.

The administration of the test takers and the tests may be performed either locally at the query server device, or remotely through a network system.

These and other objects of this invention will become more apparent from the following description and accompanying drawings in which like reference numerals depict like elements. Other details of the system and the method of the present invention are set out in the following description.

BRIEF DESCRIPTION OF THE DRAWING AND APPENDICES

The preferred embodiments of the invention will now be described with respect to the Figures of the drawing, in which:

FIG. 1 is a schematic diagram of a networked testing system.

Two appendices are attached hereto:

Appendix A is a set of printouts of screens which are presented to test administrators, test designers, and test takers; and Appendix B is a manual describing the use of the software according to the present invention.

DETAILED DESCRIPTION OF THE PREFERRED EMBODIMENTS

A preferred embodiment according to the present invention is provided in an Internet-based worldwide web browser client, web server environment. The test definition is hosted on a central web server, which is capable of defining web pages on demand, and which provides both supervisory and user interfaces through the network interface.

The operation of the system is defined herein functionally by way of its inputs and outputs. These inputs are presented as "screens", which are, in the preferred embodiment, HTML 3.0 coded web pages. The system presents a number of different types of pages or screens to users, depending on their privilege level within the system and the task being performed.

A preferred embodiment of the present invention provides a computer software system, called the "Interactive Testing And Questionnaire System" (ITS), which allows for the interactive and secure development and production of tests over the Internet using a standard web browser. The ITS server runs with any standard ODBC compliant database and any standard web server that runs on the Windows™ Operating System. Once the ITS server is running, however, all that is needed to design and develop tests is any web browser running on any platform.

As shown in FIG. 1, a query server host 1 communicates with a network 2, which may be the Internet. Client systems 3, 4 also interface with the network 2, communicating with the query server 1 and possibly other servers 5. Communication between a terminal 3 and another server 5 may be established based on references received from the query server 1. The query server 1 and client systems 3, 4 as the other server 5, may employ an encrypted communication protocol.

The ITS can be used as an enabling technology in any distance learning program to give courses and instruction over the Internet. It can also be used by school systems to keep students' records and grades. Other uses include giving surveys and any other form of test that is now given on paper. The ITS stores various statistics and other information about the test, the takers of the test and the questions on the test.

The ITS gives the test developer the freedom to concentrate on creating the test and the content of the test rather than worrying about the way the test is going to be given and how it is going to be produced. It establishes a working environment where interesting and unique kinds of tests can be given in a very dynamic medium: the Internet. This includes the ability to give multimedia based questions which consist of video clips, sound and pictures. It also includes the ability to use the resources on the computer (such as a calculator) and the Internet (such as other web pages) to aid the test taker in taking the test.

Test designing is based on the premise that the designer has information about which he seeks to inquire others about. This means that either the test taker knows about the subject matter being tested or has done research into the subject matter. When the test designer wants to see what others know about the material or take a poll or survey about the material, they give a test.

The individual elements of each section of a test are, for example, coded as follows:

1 • Links

Links appear as underlined words on the web page and represent hypertext links which, when clicked upon, take the web browser to another web page. They will appear as underlined words below.

2 • Buttons

Buttons appear as words surrounded by a box on the web page and represent items which, when clicked upon, perform some action. They will appear as bold text below. The action performed when they are clicked upon usually indicates that the browser wants to submit data entered on a web form to the ITS.

3 • Fields

Fields represent items that require input from the browser on the web page. They will appear herein as italicized text. Fields can appear as:

Empty boxes in which the test designer types text

Drop-down list boxes which require the test designer to choose a value

Radio buttons which require the test designer to select amongst various choices

Regular list boxes which require the test designer to select zero or more choices 4 • Page Text Portions of the web page other than the above which need a description. This includes sections of the web page or text items and labels that display information on the web page. They will appear herein as normal text.

The description of the screens herein is grouped into the following parts:

Test Designer Screens

Test Screens

Section (Part) Screens

Question (and Choices) Screens

Test Taker Accounts Screens

Test Assignment And Results Screens

Test Designer Screens are the web pages which appear when manipulating the test designer (i.e., person developing the tests) information. Test designer information includes personal identification (i.e., email address) and other attributes of the designer.

Test Screens are the web pages that appear when specifying the parameters for a test. They contribute to the overall scheme of a test when delivered. Some parameters include the test name and the test type.

Section (Part) Screens are the web pages that appear when manipulating information for the section(s) of a test. Sections are the basic building block of tests. The Section Screens allow tailoring of the test to meet certain needs. Examples of some section parameters include section introduction and section question order.

Question (and Choices) Screens are the web pages related to the entering of question and choice information for a particular section. They are what get asked on the test and are the fundamental unit of a test. Some parameters include the actual question and the correct answer.

Test Taker Account Screens are the web pages that appear when creating accounts for people to take a test. They help identify a particular user of a test. Some parameters for test taker accounts are test taker name and test taker email address.

Test Assignment And Results Screens are the web pages related to the assignment of test taker to take the test and the results of their performance. Just because a test taker account is created, doesn't mean that the person is automatically eligible to take a designated test. First, the test taker account(s) must be specified as eligible to take the test. Some parameters include the dates on which they can take the test and the information they must specify to take the test. Test results are given after a person takes the test. They indicate how individual people scored on the test and give some feedback about the test itself.

The ITS is based on the premise that a test is a collection of questions grouped together in some fashion. In order to group the questions, the test is first divided logically into a number of test "parts". Each test part represents a screen of information in a standard Web browser. A test part need not have any questions on it. In this case, it represents a "break" or "pause" between the other parts of the test. A test part is associated with certain characteristics that make it look and feel different than the other parts of a test.

Each test within the ITS is assigned a unique test identifier by the test designer which distinguishes it from other tests. This test identifier can be used in links (anchors) on other web pages to allow someone to take the test directly. Once the link is clicked on, they will be given the test indicated by the test identifier.

For example, a test identified as "MathTest1" has five parts on it. The first part may contain ten questions. The second test part may be a break between the first part and the third part. The third test part may contain 25 questions; the fourth 10 questions and the last 15 questions. Each part will be given independently of the others and will appear in a separate screen within the test taker's Web browser. Another web page, created independently, could contain a link to allow the browser to take the test.

Next, the test "part" itself is physically divided into a number of test "sections". Just like test parts divide up the whole test, test sections divide up each part (i.e., Web screen) of a test. A section contains a group of related questions and is the basic building block in the ITS for a test. Each section can have a heading and an ending. This allows for a common passage to be included about the questions which follow or for special instructions relating to that sections.

According to the ITS, test parts are not separate logical constructs. They are only used for terminology and theoretical purposes. Test sections, on the other hand, are real. The test designer creates a test part by combining one or more physical test sections together.

Our first part of ten questions on "MathTest1" could be broken into two sections. One section might contain six questions and the other section could have four questions. The third part, consisting of twenty-five questions, might be composed of five sections with five questions in each section.

Finally, each section consists of one or more questions. A question is the fundamental unit of a test and allows for a response from the test taker. Questions themselves are of varying types and have one or more choices.

For example, the first part above on "MathTest1" has two sections. The first section consists of six questions. The first five questions are of the type 'multiple choice' and the last question is of the type 'fill-in-the-blank'. Among our multiple-choice questions, the first three have four choices each; the next two questions have five choices each.

After the test designer builds the test, he'll want others to take it. In order to do this, the test designer must first create a "test taker account" for the person whom the test designer wishes to take the test. Test taker accounts uniquely identify a person to the ITS.

Even though an account is set up for a person, it doesn't mean that they are eligible to take the test. In order for them to take the test, the test designer must "assign" them to take it. When the test designer assigns them to take it, the test designer can have them take the test any number of times and limit the dates on which they can take it.

For example, let's say "Barbara" is desired to take "Math-Test1" developed above. First, a test taker account is created for Barbara with her personal information (i.e., email address, phone number, etc.). Once created, "Barbara" is then "assigned" to take our test from Jan. 2, 1998 to Jan. 5, 1998. She will thus be eligible to take the test twice during that time frame.

In summary, the "Interactive Testing System" uses the following conceptual hierarchical model:

Administrator(s)→Designer(s)→Test(s)→Part(s)
→Section(s)→Question(s)→Choice(s)

The test administrator(s) create zero or more test designer accounts. Each test designer can design zero or more tests. Each test consists of zero or more test parts. Each test part has zero or more sections, each of which contains zero or more questions. Each question has zero or more choices with zero or more of the choices being the correct answer.

A test part consists of one or more sections that are asked at the same time on one page of a web browser. There can be one or more sections within a test part. A test section contains zero or more questions, which in turn may have zero or more answer choices, and can be followed by:

An optional break or pause given on a separate page in the browser

Another section given on the same test part (same page in the browser)

Another section given on a different test part (different page in the browser)

The following model illustrates the above:

Test Part: Section→[Optional Break]→Section→ [Optional Break] . . .

The test administrator can create test designer accounts and test taker accounts. Each test designer account can create test taker accounts or use those created by the test administrator:

Test Administrator→Test Taker(s)

X Test Designer→Test Taker(s)

Common Screen Features

All screens in the ITS share some common features. This section will discuss the general appearance of each screen used in the ITS, as shown in Appendix A. Note that the tests the test designer creates can be tailored with any desired look and feel, available employing web browser technology on a client machine. This section only pertains to those screens that are for the development and design of the tests.

A logo (or other graphics) and background of each page may be defined.

Following the screen title, the particulars of the individual screen (i.e., screen information) will appear. After the screen information appears, a basic summary of what the items on the screen mean and how to manipulate them follow. This information is presented in further detail below. At the bottom of every page is a footer. This footer can be anything the test designer wants to place (as long as the test designer can code it in using HTML) at the bottom. The default is a Test Home Page link. Clicking on the link takes the test designer to the "Test Maker" Screen (i.e., the beginning screen).

Designing Tests

When giving a test, it is sometimes desirable to include a "Test Preface" (i.e., "Outline") before the actual test is given and a "Test Summary" after the test is given. The preface (outline) indicates the general format of the test and can include (but is not limited to):

the number and sequence of parts a test contains the number of questions to expect on each part of the test the amount of time allowed for each part instructions about how to complete the test The summary indicates what actions the test taker should take next and dictates what the test taker can do after the test (i.e., "Close your manual and tell the instructor you are finished").

The ITS gives the test designer great flexibility to tailor the test preface and summary to meet various needs. These are typically formulated as a "fake" section with zero questions on it that will be given out first or last on the test. This section, like every other section, can be customized to meet various needs (i.e., it can be given on its own test part and have the web page that shows the section be based on the own template file). By not having any questions in the section, this section is special in that it will be for display purposes only (i.e., no questions will be given).

Not only can the preface and summary have individualized instructions on them, but the test designer can also control how much time is spent looking at (reading) them, the number of times they can read the instructions and ask questions in order to get feedback from the test taker. These sections may also include a video clip or play a sound clip telling the test taker how to complete the test.

Test Maker ("Initial") Screen

This is the first screen the test designer will see every time the test designer starts using the ITS (unless the test designer knows the URL of another page to go to it directly). This page is filled with information and ideas about what the test designer can do with the ITS. It is where every one begins. From here, the test designer can perform other tasks via the links presented on the page. This screen has the following elements:

Take A Test • Presents a list of tests which the test designer can take. Using this link allows the test. designer to take a test without actually having an account on the ITS system.

Maintain Your Test(s) • Allows the test designer to design, develop, manage and give out the tests. A series of pages is presented which give the test designer control over every aspect of test design and test taker account management. The "Test Designer Login Screen" will be presented next.

View Test Results, Take Tests Or Change Your Personal Information • Allows the test designer to view the test results and to take tests for which a test taker has been assigned. A series of pages is presented which allow the test designer to review tests taken previously, compute grades and averages based on the tests a test taker has taken, take tests that have been assigned, email the test designer and modify personal account information.

Maintain Your Tests ("Test Designer Login") Screen

This web page appears after clicking on the Maintain Your Test(s) link from the Test Maker (Initial) Screen. From here, the test designer fills in test designer account information so that the personal test information will be displayed. A designer logon identifier and password is required. This screen has the following elements:

Designer ID • Enter the designer account identifier in the box to the right. Identifiers are not case sensitive.

Password • Enter the designer account password in the box to the right. Passwords are case sensitive and may not be left blank.

Logon • After entering the Designer ID and Password, click on the Logon button to log into the ITS and maintain the tests.

Reset • Press the Reset button in order to erase the information entered and begin again.

Designer Information And Tests ("Main Test", "Test Central") Screen

This web page is the main entry point from where ALL test maintenance operations are performed. When 'lost' or deep in nested links, this screen provides a frame of reference. From this web page, the test designer can modify and delete the personal test designer information, create test taker accounts, assign test takers to take specific tests and modify and create tests. The top portion of the web page lists the personal test designer information. The middle portion of the web page lists the various tests created (if any). The bottom portion of the web page lists simplified instructions for creating tests. This screen includes the following elements:

Designer Information • The top portion of the screen lists the test designer information. It includes a brief synopsis of the personal information:

Designer Name
Logon Identifier
Address (Line 1)
Address (Line 2)
City
State
Zip Code
Phone Number
Fax Number
Email Address If any of this information is inaccurate, the test designer should correct it by clicking on the links to the right of the information listed.

Modify • Clicking on this link presents the "Modify Your Test Designer Information" Screen. It allows the test designer to modify the personal test designer information and password. Keeping this information up to date is important since it let's others know who the test designer is within the ITS.

Delete • Clicking on this link presents the "Delete Your Test Designer Information" Screen. When the test designer no longer wishes to create and maintain tests, deleting the account will remove ALL of the information (as well as the tests and test taker accounts created).

You Have Designed X Tests • This message will appear before the test information (if any). It indicates the number of tests the test designer has created.

You Have Reached Your Limit Of X Tests . . . Please email Us To Increase Your Limit Of X • The test administrator can impose (and alter) a restriction on the number of tests the test designer can create.

Create New Test • The "Create A New Test" screen will appear. From here, the test designer can create new test by filling in the appropriate new test information.

Administer Test Takers • The "Your Personal Test Takers" screen will appear. From here, the test designer can create new test taker accounts, change information about current test taker accounts and delete test taker accounts.

Cancel Outstanding Tests • The "Cancel Outstanding Tests" screen will appear. From here, the test designer will see a list of tests that are currently being taken. The test designer can cancel these tests. For example, someone may have closed his or her web browser in the middle of a test. The test will still be 'out'. This screen allows the test designer to cancel the test manually.

We Are Proud To Present Your Tests . . . • A list of tests follows along with specific information about the individual test:

Full Test Name
Test Identifier (Used In URL)
Test Type
Total Number Of Questions
Give Sections In Random Order?
Minimum # Of Sections To Give
Maximum # Of Sections To Give
Low Score
High Score
Passing Score
Reward URL
Failure URL
Show Answers To Questions?
Skeleton When Test Taker Logs On
Skeleton File When Grade Q's Try • This link appears next to a test. It allows the test designer to take the test and see how it will look when given to a test taker. The next screen to appear will be "Take Your Test".

Modify • This link appears next to a test. It allows the test designer to modify the test information. The next screen to appear will be "Modify Your Test Information".

Delete •This link appears next to a test. It allows the test designer to delete the test. The next screen to appear will be "Delete Your Test Information".

Sections • This link appears next to a test. It allows the test designer to view the test section information. The next screen to appear will be "Test And Section Information".

Takers • This link appears next to a test. It allows the test designer to assign people to take the test. The test designer can also email and view how well the test takers have done on the test. The next screen to appear will be "Test Takers Assigned To Take This Test".

Statistics • This link appears next to a test. It allows the test designer to view various statistics about the test. The next screen to appear will be "Test Statistics".

You Have A Total Of X Questions On Y Tests • The total number of questions in ALL of a designer's tests is listed.
Modify Your Test Designer Information Screen This web page appears after the test designer clicks the Modify link next to the designer information on the "Designer Information And Tests" Screen. This page allows the test designer to change the personal test designer information and password. This screen has the following elements:

Current Password • Enter the current password for security reasons. The password must match in order for the test designer to change the test designer information. This field is case-sensitive and required.

New Password (Enter Twice) IF Changing • If the test designer wishes to change the password, the new password is entered in both boxes. This is necessary for making sure that the new password is typed correctly. For no change, these fields may be left blank. The information entered is case-sensitive. These fields are optional.

Designer Name • Enter the designer name. This field is case-insensitive and required.

Account Identifier • Enter the account identifier. It must be unique among all of the test designers. This field is case-insensitive and required.

Phone Number • Enter the phone number. Only numbers, parentheses ('(' and ')') and dashes ('-') are allowed. This field is required.

E-Mail Address • Enter the email address. It is of the form: <username>@<host name>. This field is case-insensitive and required.

Address, Line #1 • Enter the first line of the address. This field is case-insensitive and optional.

Address, Line #2 • Enter the second line of the address (if any). This field is case-insensitive and optional.

City • Enter the city. This field is case-insensitive and optional.

State • Enter the state from the pick-list. This field is case-insensitive and optional.

Zipcode • Enter the zip code. Only numbers and dashes ('-') are permitted. This field is optional.

Fax Number -Enter the fax number. Only numbers, parentheses ('(' and ')') and dashes ('-') are allowed. This field is optional.

Modify • After the test designer has entered or modified the required information above, press this button to process the information. The results of the changes will be displayed. If successful, the "Designer Information And Tests" Screen will appear. If unsuccessful, a message indicating what went wrong will appear and the test designer will have the option to press the "Back Button" in the browser to try again.

Reset Values • Press this button to discard changes and start over.

Delete Your Test Designer Information Screen

This web page appears after the test designer clicks the Delete link next to the designer information on the "Designer Information And Tests" Screen. This page allows the test designer to delete the personal test designer account and all tests and tests taker accounts created. This screen has the following elements:

Password • Enter the password for security reasons. The password must match that stored in the ITS in order for the test designer to delete the test designer account. This field is case-sensitive and required.

Personal Information About To Delete • A brief synopsis of the personal information will appear:

Designer Name
Address (Line 1)
Address (Line 2)
City
State
Zip Code
Phone Number
Fax Number
Email Address Delete • After the test designer has entered the designer password, press this button to process the information. The results of the changes will be displayed. If successful, a message indicating the success will appear. If unsuccessful, a message indicating what went wrong will appear and the test designer will have the option to press the "Back Button" in the browser to try again.

Reset Values • Press this button in order to discard the changes and start over.

Create A New Test Screen

This web page appears after the test designer clicks the Create New Test link on the "Designer Information And Tests" Screen. This page allows the test designer to create a new test by specifying different parameters for the test. This screen includes the following elements:

Password • Enter the current password for security reasons. The password must match that stored in the ITS in order for the test designer to create a new test. This field is case-sensitive and required.

Full Test Name • Enter the full name of the test. This field can be anything that the test designer wants and doesn't have to be unique. It will appear when the test is given out. This field is case-insensitive and required.

Test (URL) Identifier • (Only Alpha-Numeric Characters) (http://. . . cgi-win/test.exe/<URL Identifier>)

Enter a unique test identifier. Only alphanumeric characters (no spaces or wildcard characters) are allowed in the identifier and the identifier must be unique among all of the tests the test designer creates. This field is used inside an 'anchor' on another web page to allow someone to take this test via a direct link. It allows for the a web browser to contain a link to the test and for the test designer to write web pages introducing the test. This field is case-insensitive and required.

The web URL to take the test is of the form:

<URL Base Address>/<Test Identifier>?ut_id=#

Where: <URL Base Address> Represents the base address URL for the ITS (for example: http://test.webarea.com/test.exe <Test Identifier> Represents the identifier entered above (i.e., "MathTest1")

Represents the user-test identifier number. This number is a system assigned entry which is obtained when the test designer assigns a user to take the test. Note: If no # is entered, the ITS will prompt for an entry before proceeding.

For example, a valid URL to take the test might be:

http://test.webarea.com/cgi-win/test.exe/mathtest1?ut_id=4

Test Type • Enter the type of test from the pick-list. The choices are:

Regular
Progressive
Sequential

A 'Regular' test is one where the test taker is given the whole test at once and proceeds to take the test by going to the various parts and answering the questions according to the way the test was designed. A 'Progressive' test (also known as "Adaptive" test) is a test where a new "part" of the test will be determined based solely on the answers put to the questions on the last test part given. That is, the test is not in a pre-determined order. The new test part is determined based on how well the test taker did in the previous part. In order to determine what part of the test is given next, the last part of the test is graded. If the score from the last test part is less than a certain 'passing score', then the test taker is given a certain test part. If the score from the last test part is equal to the 'passing score', a (possibly) different test part is given. If the score from the last test part is greater than the 'passing score', then another test part is given. A 'Sequential' test is one where the test taker does not have the option to jump from one test part to another at will. Instead, the test taker must go in a 'sequential' manner from the first test part to the last test part and this order is enforced.

Give Sections In Random Order? (versus Sequential Order) • This entry is a checkbox and required. By placing a check in the checkbox, the test designer indicates that the sections on this test should be given out randomly. If the checkbox is left unchecked, the sections on a test will be given out sequentially, according to the order in which they were entered.

Note that if more sections are requested in a test than there is in the actual test, sections will be repeated. For example, if five sections are available on a test and the system randomly gives seven sections (see below for setting minimum and maximum values), each of the five sections are randomly picked and given on the test. Next, two sections from the five sections are picked and given. Sections are not repeated on a test until all the sections have been given, as with the questions.

Minimum # Of Sections To Give For Test (Nothing Is 'EVERY SECTION') • Enter the minimum number of sections that will be asked on the test. The test designer can enter values from zero to 32,767 or leave it blank. The number of sections asked on a test will be from the minimum specified here to the maximum value. Blank values will mean "use the number of sections currently in the test". The minimum value, if entered, must be less than or equal to the maximum value. This field is not required.

Maximum # Of Sections To Give For Test (Nothing Is 'EVERY SECTION') • Enter the maximum number of sections that will be asked on the test. The test designer can enter values from zero to 32,767 or leave it blank. The number of sections asked on a test will be from the minimum value to the maximum value specified here. Blank values will mean "use the number of sections currently in the test". The maximum value, if entered, must be greater than or equal to the minimum value. This field is not required.

Low Score • Enter the lowest score possible from the test. Test scores will be in the range from the lowest score to the highest score entered when creating the test (for example, the SAT's will have a low score of 200 and a high score of 800). Note that the low score can be greater than the high score allowing for tests which require the test taker to get "the most answers incorrect". In this case, every answer gotten correctly will be translated into a lower score (assuming that the point values assigned to the test questions are positive numbers). If this field is left blank, a value of zero will be assumed. Fractions are allowed. This field is not required.

High Score • Enter the highest score possible from the test. Test scores will be in the range from the lowest score to the highest score entered when creating the test (for example, the SAT's will have a low score of 200 and a high score of 800). Note that the high score can be less than the low score allowing for tests which require the test taker to get "the most answers incorrect". In this case, every answer gotten correctly will be translated into a lower score (assuming that the point values assigned to the test questions are positive numbers). If this field is left blank, a value of one hundred will be assumed. Fractions are allowed. This field is not required.

Passing Score • Enter the passing score for the test. When graded, the test score is compared to the passing score. If the test score is greater than or equal to the passing score, the test taker will be sent to a "Reward" URL. If the test score is less than the passing score, the test taker will be sent to a "Failure" URL. If this field is left blank, a value of fifty will be assumed. Fractions are allowed. This field is not required.

Reward URL (If Pass) • Enter a URL to go to if the test taker gets a score greater than or equal to the passing score for the test. If this field is blank, then the test taker's web browser page will not be changed to any URL. This field is not required.

Failure URL (If Fail) • Enter a URL to go to if the test taker gets a score less than the passing score for the test. If this field is blank, then the test taker's web browser page will not be changed to any URL. This field is not required.

Show Answers To Questions? • This entry is a checkbox and required. By placing a check in the checkbox, the test designer indicates that the test taker should be allowed to see the answers to the test after receiving a score. This can be good for instructional purposes or to give the test taker confidence that the ITS is functioning properly. If the checkbox is left unchecked, the answers to the questions will not be available to the test taker. This can be good if the test designer doesn't want others to know what the correct answers are and want to give out the test to again at a later time.

Skeleton For Logging On (Local File Name <!—<TEST>—>) • Enter the URL (a place on the web) or local file name where the 'skeleton [file]' used for logging on to take the test is kept. Skeleton files are HTML files that contain key tag words embedded in the text. They allow the test designer to completely tailor what a test taker's web browser page will look like. The ITS will read in the skeleton file and search for certain keywords. Upon finding the sequence of characters (in this case, "<!—<TEST>—>" (no quotation marks)) in the file, the ITS will substitute any data that it is responsible for providing. When a test taker goes to 'log on' to take the test, they will see the skeleton HTML file the test designer designed with the ITS's logon information embedded at the tag position in the page. The test taker will not have any idea as to what other ITS web pages look like and will feel that this test is unique. This field is case-sensitive and not required.

Skeleton For Grading (Local File Name <!—<TEST>—>) • Enter the URL (a place on the web) or local file name where the 'skeleton [file]' used for showing grading results is kept. Skeleton files are HTML files that contain key tag words embedded in the text. They allow the test designer to completely tailor what a test taker's web browser page will look like. The ITS will read in the skeleton file and search for certain keywords. Upon finding the sequence of characters (in this case, "<!—<TEST>—>" (no quotation marks)) in the file, the ITS will substitute any data that it is responsible for providing. When a test taker finishes taking their test and after the test has been graded, they will see the skeleton HTML file the test designer designed with the ITS's grade information embedded at the tag position in the page. The test taker will not have any idea as to what other ITS web pages look like and will feel that this test is unique. This field is case-sensitive and not required.

Create • This button appears at the top and bottom of the field information for the test. After the test designer have entered the required test information, press the Create button to create the test (a valid designer password is required). The results of creating the test will be displayed. If successful, the "Designer Information And Tests" Screen will appear, showing the newly created test. If unsuccessful, a message indicating what went wrong will appear and the test designer will have the option to press the "Back Button" in the browser to try again.

Erase Values • This button appears at the top and bottom of the field information for the test. Press this button in order to erase the entries and start again.

Modify Your Test Information Screen

This web page appears after the test designer clicks the Modify link to the right of the particular test the test designer wants to modify on the "Designer Information And Tests" Screen. This page allows the test designer to modify the test by specifying different parameters for the test. It contains the exact same fields as described in the "Create A New Test" Screen. Only the differences in the buttons on the top and bottom of the screen are described herein. This screen has similar elements to the "Create A New Test" Screen. In addition, is has the following elements:

Modify • This button appears at the top and bottom of the field information for the test. After the test designer has modified the required test information, press the Modify button to modify the test parameters (a valid designer password is required). The results of modifying the test will be displayed. If successful. the "Designer Information And Tests" Screen will appear, showing the test with the changes. If unsuccessful, a message indicating what went wrong will appear and the test designer will have the option to press the "Back Button" in the browser to try again.

Reset Values • This button appears at the top and bottom of the field information for the test. Press this button in order to reset the entries to their previous values and start again.

Delete Your Test Information Screen

This web page appears after the test designer clicks the Delete link to the right of the particular test the test designer wants to delete on the "Designer Information And Tests" Screen. This page allows the test designer to delete the test. All the test information, questions and sections as well as the people assigned to take the test are removed. This screen has the following elements:

Password • Enter the current password in order to delete the test for security reasons. The password must match that stored in the ITS in order for the test designer to delete the test. This field is case-sensitive and required.

Information About The Test The test designer Is Going To Delete (Please Refer To The "Create A New Test" Screen For An Explanation Of Their Meaning):

Full Test Name
Test (URL) Identifier
Minimum # Of Sections To Ask At Once
Maximum # Of Sections To Ask At Once
Low Score
High Score
Passing Score
Reward URL
Failure URL
Show Answers To Questions?
Skeleton For Logging On
Skeleton File For Grading Q's Delete • This button appears at the bottom of the screen. After the test designer has entered the password, press the Delete button to delete the test (a valid designer password is required). The test and all associated information including any sections, questions, test results and people assigned to take the test are removed. The outcome of deleting the test will be displayed. If successful, the "Designer Information And Tests" Screen will appear, showing that the test has been removed. If unsuccessful, a message indicating what went wrong will appear and the test designer will have the option to press the "Back Button" in the browser to try again.

Reset Values • This button appears at the bottom of the screen. Press this button in order to reset the password and start again.

Test and Section Information Screen

This web page is the main entry point from where all section maintenance operations are performed. From this screen, the test designer can add, copy, modify, delete, add questions and view statistics about sections on the test. The test designer can also modify and delete the test information on which the sections depend and take a sample test. The top portion of the web page is a synopsis of the test information. The middle portion of the web page lists the various sections created (if any). The bottom portion of the web page lists simplified instructions for creating and manipulating sections. This screen has the following elements:

Add New Section • This link appears both at the top of the screen and below the 'Test it Information' portion of the screen. Clicking on this link presents the "Add Old Or Create New Test Sections" Screen. It allows the test designer to add a new section (either by 'creating' a new section or by 'copying' or 'linking' in an old section) to the test.

Test And Designer Information • This link appears near the top of the screen. Clicking on this link presents the "Designer Information And Tests" Screen (also known as, "Test Central" or the "Main Test" Screen).

Your Test Information Follows . . . (also known as, 'Test Information') • The top portion of the screen lists the test information. It includes a brief synopsis of the test information:

Test Name
Test ID
Minimum # Of Sections To Give
Maximum # Of Sections To Give
Ask Sections In Random Order?

If any of this information is inaccurate, it may be corrected by clicking on the links to the right of the information listed.

Try • This link appears to the right of the 'Test Information'. It allows the test designer to take the test and see how it will look when given to a test taker. The next screen to appear will be "Take Your Test". This link does the same thing as the Try test link that appears on the "Designer Information And Tests" Screen.

Modify (Test Information) • This link appears to the right of the "Test Information". It allows the test designer to modify the test information. The next screen to appear will be "Modify Your Test Information". This link does the same thing as the Modify test link that appears on the "Designer Information And Tests" Screen.

Delete (Test Information) • This link appears to the right of the "Test Information". It allows the test designer to delete the test. The next screen to appear will be "Delete Your Test Information". This link does the same thing as the Delete test link that appears on the "Designer Information And Tests" Screen.

You Have X Section(s) On This Test • Underneath the "Test Information" will be a message indicating the number of sections the test designer currently has on this test.

Add New Section • Refer to the discussion above for the same link.

We Are Proud To Present The Sections On Your Test . . . • A list of sections on the test (IF any) follows this message. Every section has the following links to the right of its information:

Modify

Delete

Questions

Statistics

Every section is listed with the following information about it:

Section Order #

Section Heading

Section Weight (Relative To 1.0)

Number Of Questions In Section

Min # Of Qs To Ask Per Diff Lvl

Max # Of Qs To Ask Per Diff Lvl

Question Order

Section Time Limit

Min Section Time

Time To Pause After Section

Min Time To Pause After Section

Skeleton For Section

Skeleton For Break After Section

Progressive Test Scores: Passing, Low, High

Next Section Orders For >, <and=To Passing Score

See above for a complete discussion about the meanings of the above section parameters, in the "Add Old Or Create New Test Sections" Screen.

Modify (Section Information) • Clicking on this link presents the "Modify Test Section" Screen. It allows the test designer to modify the test section information.

Delete (Section Information) • Clicking on this link presents the "Delete Test Section" Screen. When the test designer wishes to remove the section from the test, clicking on this link will delete all of the section and question information. Note: Deleting a section will ONLY remove the section permanently if it is not used in another test (or again in the same test). When the test designer adds a section from another test (or the same test), the test designer chooses whether to 'link' (i.e., create a 'reference' to) the section or to 'copy' the section over completely. If the test designer chooses to 'link' the section in, only one copy of the section exists and is shared. In this case, the questions on both of the sections are always the same and deleting one section will not remove the other section. It will only delete the reference to the section.

Questions • Clicking on this link presents the "Select, Add Or Create Test Questions" Screen. When the test designer wishes to manipulate the questions in the section, click on this link.

Statistics • Clicking on this link allows the test designer to view various statistics about the section. The next screen to appear will be "Section Statistics".

You Have A Total Of X Questions In Y Sections • The total number of questions in all of the test sections is listed.

Add Old or Create New Test Sections Screen

This web page appears after the test designer click the Add New Section link on the "Test And Section Information" Screen. This page allows the test designer to add a new section by either copying a previously designed section or creating an entirely new section. If creating a 'new' section, the test designer can specify the different parameters for the section on this web page. The top half of the screen allows the test designer to add a section from a previously created test. When the test designer adds a section, he has two choices:

Copy the section and questions over to the new test completely

Link the section and questions over to the new test by creating a reference to the current section Creating a reference (i.e., 'link') to the previously created section allows the questions to be maintained in one place and updated in both sections automatically. Copying the previously created section over makes a completely new section with the same questions. Modifying the questions in one section has no effect on the questions in the other section (and visa-versa). If the test designer wishes to create a 'new' section with different questions, the test designer should only worry about the bottom portion of the "Add Old Or Create New Test Sections" Screen. This screen has the following elements:

View Test Sections • This link appears near the top of the web page. Clicking on it will present the "Test And Section Information" Screen.

Add Section From A Previously Created Test . . . • A drop-down list box will appear for this field. If the test designer is copying a previously designed section, select the test in which it exists.

Search Above Test For Section To Add • After selecting a test from the pull-down list box, click on this button to go to the "Add Section From A Test" Screen.

OR • This key word, "OR", separates the 'add' previously designed section part of the web page from the 'create' a new test section part.

Create A New Test Section • Enter Your New Section Information And Press 'Create'. These three lines are the heading which appear before the test designer is prompted with parameters about the section the test designer wishes to create.

Password • Enter the current password for security reasons. The password must match that stored in the ITS in order for the new section to be created. This field is case-sensitive and required for creating a new section.

Section Order (F-first, L-last, 1-first, 2-second, etc.) • The section order fields represent the order (i.e., the position relative to the other sections on the test) which the test designer wants want the section to appear in. Sections within the same test can be placed in the same position (i.e., they can have the same order number within the test). In this case, when the test is given, one of these sections will be randomly chosen to appear on the test. The section order is determined by the two fields which follow:

Insert In Separate Place At

Combine With [Add To] Others In

These radio buttons represent how the section order (position) field below should be interpreted. If the 'Insert In Separate Place At' radio button is selected, then the position entered below will be interpreted as a place in which to insert the section. If the 'Combine With [Add To] Others In' radio button is selected then the position entered below will be interpreted as the place in which to combine the sections. This field is required. For example, if two sections are currently on the test and the designer wishes to 'Insert' a section in the middle, that section will have it's own place. A value of two is entered for the position. Once created, three sections will exist with the relative ordering: 1, 2, 3. The newly created section will be placed in position two. If, however, the 'Combine' radio button was selected instead, the newly created section would have shared the second position with the current second section. The relative ordering would now be: 1, 2 2. Our newly created section will share position two with the other section. At test time, the section actually used in position two will be randomly selected. This allows for the random selection of a section from a pool of sections and prevents test takers from being able to look over the shoulders of their neighbors and "accidentally" cheat.

Position • This field determines the position (relative to the other sections on the test) which the test designer either wants to 'Insert' or 'Combine' the section in. If inserting, this number must be in the range from one to the number of sections currently on the test plus one. If an 'F' is entered, the section will be inserted in the first section. If an 'L' is entered, the section will be positioned after the last section on the test. If combining, this number must be in the range from one to the number of sections currently on the test. If an 'F' is entered, the section will be combined with the first section. If an 'L' is entered, the section will be combined with the last section on the test. This field is required.

Section Heading • This field represents the actual heading displayed for the section. It is a way for the test designer to give a label to the section (HTNL tags okay). This field is case-sensitive and optional.

Section Weight (Relative To Other Sections) • This field represent the weight (usually relative to a standard 1.0 value) of this section on the test. When test raw scores are computed, the following formula is used:

$$\text{Test Raw Score} = (W1*S1) + (W2*S2) + \ldots + (WN*S\,N),$$

where WN represents the weight of section 'N' and SN represents the raw score computed for section 'N'. Using a section weight allows for one section to be given more 'weight' or value compared to the other sections on a test when computing the final test score. Section weights can be negative (in which case the section is detrimental to the final score) or zero (in which case the section is not important in determining the final score . . . i.e., 'a sample section' where the test taker doesn't know which sections actually count and the 'sample section' can be used as an indicator of questions to give on future tests). Just for completeness, the actual score is computed from the test raw score by taking into account the "highest" possible raw score for a test (as determined by the values assigned to the individual test questions), the "lowest" possible raw score for a test (as determined by the values assigned to the individual test questions) and the final score range desired for the test. The actual formula is complex and will not be presented here.

Question Order • The order in which the questions are presented to the taker is determined by the next two field entries. Questions can be assigned a difficulty level based on the relative hardness of the question (refer to "Add Old Or Create New Section Question" Screen). This difficulty level can help determine the order in which questions are asked within a section. The pull-down list box determines how the difficulty level will be used:

1. 'Ignore Difficulty Level' Option. The difficulty level will not be used in determining the question order within a section. Instead, the Question Sequence Sequential (vs Random)? checkbox will be fused by itself to determine the question order within the section. The number of questions asked will be determined by the Min # of Qs To Give Per Difficulty Lvl and Max # Of Qs To Give Per Difficulty Lvl settings as described below.

2. 'Increasing Difficulty Level' Option. Questions will be asked by order of increasing difficulty level. The number of questions asked within each difficulty level will be determined by the Min # Of Qs To Give Per Difficulty Lvl and Max # Of Qs To Give Per Difficulty Lvl settings as described below.

3. 'Decreasing Difficulty Level' Option. Questions will be asked by order of decreasing difficulty level. The number of questions asked within each difficulty level will be determined by the Min # Of Qs To Give Per Difficulty Lvl and Max # Of Qs To Give Per Difficulty Lvl settings as described below.

4. 'Random Difficulty Level' Option. Questions will be asked by order of a random difficulty level. The number of questions asked within each difficulty level will be determined by the Min # Of Qs To Give Per Difficulty Lvl and Max # Of Qs To Give Per Difficulty Lvl settings as described below.

5. 'One Difficulty Level To Right' Option. Questions will be asked at one difficulty level listed to the right of the pull-down list box. The difficulty level entered can be blank or a number from zero to 255. The number of questions asked within the difficulty level will be determined by the Min # Of Qs To Give Per Difficulty Lvl and Max # Of Qs To Give Per Difficulty Lvl settings as described below.

Note that questions selected will not repeat until necessary. For example, if five questions are selected at a difficulty level of ten and there were only seven questions that had a difficulty level often, then ITS would first ask each of the seven. questions once. ITS would then select three of the questions from the seven to ask next. The system would not ask three question number ones before asking all of the questions twice. This field is required.

Question Sequence Sequential (vs. Random)? • This check box determines the order that the questions within a section (and within a certain difficulty level if indicated by the drop-down list box) will be asked in. If the check box is checked, then the questions will be asked in the order that they have been entered in the ITS. If the box is not checked, then the questions will be asked randomly. The drop-down list below determines whether the question order is first determined by the difficulty level and then asked randomly or sequentially within that difficulty level. This field is required.

Min # Of Qs To Give Per Difficulty Lvl • (Nothing Is 'EVERY QUESTION') (If "Ignoring Difficulty Lvl", Per Section) • Enter the minimum number of questions that will be asked on the section. If the pull-down list box has the option 'Ignore Difficulty Level' within it, then the minimum represents the minimum number of questions to ask within the section. If the pull-down list box has a difficulty level, then the minimum represents the number of questions to ask within the difficulty level. The test designer can enter values from zero to 32,767 or leave it blank. The number of questions asked on a test will be from the minimum specified here to the maximum value. Blank values will mean "use the number of questions currently in the section". The minimum value,if entered, must be less than or equal to the maximum value. If this value is greater than the number of questions in the section, the questions will be repeated. However, no question will be repeated until all of the questions in the section have been exhausted. This field is not required.

Max # Of Qs To Give Per Difficulty Lvl (Nothing Is 'EVERY QUESTION') (If "Ignoring Difficulty Lvl", Per Section) • Enter the maximum number of questions that will be asked on the section. If the pull-down list box has the option 'Ignore Difficulty Level' within it, then the maximum represents the maximum number of questions to ask within the section. If the pull-down list box has a difficulty level, then the maximum represents the number of questions to ask within the difficulty level. The test designer can enter values from zero to 32,767 or leave it blank. The number of questions asked on a test will be from the minimum specified here to the maximum value. Blank values will mean "use the number of questions currently in the section". The maximum value, if entered, must be greater than or equal to the minimum value. If this value is greater than the number of questions in the section, the questions will be repeated. However, no question will be repeated until all of the questions in the section have been exhausted. This field is not required.

Section Time Limit (In Minutes) [Blank=Unlimited] • This field determines how long (in minutes) the test designer wants to allow the test taker to take this section for. Only values great than zero or blank are allowed. Fractions of minutes are permitted. Blank values indicate an unlimited amount of time is allowed. This field is not required.

Minimum Time Must Spend In Section Per Visit (In Minutes) [0=None] [Blank Time Limit Above (Most Time Possible)]* • This field determines how long (in minutes) the test taker must spend in this section. Only values great than or equal to zero or blank are allowed. Fractions of minutes are permitted. Blank values indicate that the test taker should spend "the most time possible" in this section as indicated by the section time limit above. A value of zero indicates that there is no minimum amount of time required to be spent in this section. If there is not enough time left in the section to allow for the test taker to complete their minimal time requirement, then the test taker will not be allowed to work on this section of the test. This field value must be less than or equal to the time limit for the section. This-field is not required.

Time To Pause After Section (In Minutes) [Blank= Unlimited][0=No pause, Next Section In Same Test Part] [Negative=No Pause, Next Section In Next Test Part] • This field determines how long (in minutes) the test designer wants to allow the test taker to pause for (or break) after this section is given. Sections in a test are self-contained units. Each section acts independently of the other sections on a test. Pauses help group sections into logical test parts (or web pages). This field is not required. There are three possibilities when giving a pause after a section:

1 • To give a pause (break) after a section for a certain amount of time. • This option indicates that there should be a separate "Part", which represents a break, given after the current web page (test part) containing the section. To do this, either a certain amount of time greater than zero (in minutes) should be entered or the field should be left blank, indicating an unlimited amount of time to pause after this section. Fractional minutes are allowed.

2 • Not to have a pause after a section, but to give the next section following the current section (if any) on the same test part. • This option indicates that there should be no new test part. Instead, the next section following the current section should be given on the current test part (web page). Enter a zero in this field to indicate this option.

3 • Not to have a pause after a section, but to give the next section following the current section (if any) on a different test part. This option indicates that there should be a new test part given after the current test part. The next section following the current section should be given on a different test part (web page). Enter a negative value in this field to indicate this option.

Minimum Time Must Pause (If Any) Per Visit (In Minutes) [0=None] [Blank=Pause Time Above (Most Time Possible)]* • This field determines how long (in minutes) the test taker must spend in the pause part after the section (if any). It is valid only if a pause is being given after the section. Only values great than or equal to zero or blank are allowed. Fractions of minutes are permitted. Blank values indicate that the test taker should spend "the most time possible" pausing as indicated by the section pause time above. A value of zero indicates that there is no minimum amount of time required to be spent pausing. If there is not enough time left in the pause part to allow for the test taker to complete their minimal time requirement, then the test taker will not be allowed to pause in this part of the test. This field value must be less than or equal to the pause time for the section. This field is not required.

Visits Allowed (Number Of Times Can Take) • This field represents the number of 'visits' a test taker is allowed for a section. When taking a test given by the ITS, only one part at a time is displayed in the web browser. The test taker goes from one part of the test to another by clicking on links embedded within the test part or web page (refer to the ITS Test Taking Guide for more information about taking tests). The test taker can be limited to a certain number of 'visits' to (i.e., the number of times they can work on or take) the test part. This number is determined by the entry in the Visit Allowed field. All of the sections on the same test part will sum this field's value to obtain the total number of visits allowed to the test part. Valid values are greater than or equal to zero and blank. Blank values mean that an unlimited number of visits to the test part that contains the section is allowed. Fractions are allowed. For example, the test designer may have two sections on one test part. Each section could allow someone to 'visit' the test part for 1.5 times. The total number of visits allowed for this test part would then be three. This field is not required.

It is noted that browsers (and many servers) cache received web pages, and often these may be printed. If these possibilities present significant issues, then the data can be encrypted using one of the known protocols, which would limit interception and appropriation of content during transit. The data may be received, instead of directly by a browser, by a "helper" application which allows the user to interface with the system, but blocks printing or saving of the file, and optionally blocks operating system level misdirection of the data, such as by a Windows screen print utility. Thus, the system is made secure, at the expense of reduced compatibility with standard commercially available products, such as web browsers. It is noted, however, that some browsers may support such security techniques as a native mode, thus alleviating the need for a helper application, and limiting any incompatibilities.

Pause Visits Allowed (Number Of Times Can Pause)* • This field represents the number of 'visits' a test taker is allowed for a pause part following the section. It only applies when there is a pause after a section (i.e., when there is a pause part). When taking a test given by the ITS, only one part at a time is displayed in the web browser. Pauses are no exception. The test taker goes from one part (pause or regular) of the test to another by clicking on links embedded within the test part or web page (refer to the ITS Test Taking Guide for more information about taking tests). The test taker can be limited to a certain number of pause 'visits' to (i.e., the number of times they go to or take) the pause part. This number is determined by the entry in the Pause Visits Allowed field. All of the sections on the same test part prior to the pause part will sum this field's value to obtain the total number of pause visits allowed to the pause part. Valid values are greater than or equal to zero and blank. Blank values mean that an unlimited number of visits to the pause part following the section(s) is allowed. Fractions are allowed. For example, the test designer may have two sections on the previous test part. Each section could allow someone to 'visit' the pause part for 1.5 times. The total number of pauses allowed for this pause part would then be three. This field is not required.

Section Introduction (i.e., Instructions About Section, Message, Passage On Which Questions Are Based) • This field represents what will appear on the test part prior to the section questions being listed and after the section heading appears. It is used to indicate to the test taker what the following questions refer to. For example, it could be instructions for completing the section, a special message to the test taker or a passage on which the questions following are based. HTML tags are allowed within the section introduction. This field is case-sensitive and not required.

Section Ending (i.e., Instructions On What To Do Next, Message) • This field represents what will appear on the test part after the section questions have been given. It is used to flag to the test taker that the section has ended. For example, it could be instructions for what to do next after completing the section, a special message to the test taker, an indication that a passage relating specifically to the questions has ended or that the questions following are not to be considered part of the previous section. HTML tags are allowed within the section ending. This field is case-sensitive and not required.

Skeleton For Section (Local File Name <!—<TEST>—>) • Enter the URL (a place on the web) or local file name where the 'skeleton [file]' used when the section is presented to the test taker is kept. Skeleton files are HTML files which contain key tag words embedded in the text. They allow the test designer to completely tailor what a test taker's web browser page will look like. Anything the test designer can put on a web page can be presented to the test taker. The ITS will read in the skeleton file and search for certain keywords. Upon finding the sequence of characters (in this case, "<!—<TEST>—>" (no quotation marks)) in the file, the ITS will substitute any data that it is responsible for providing. When a test taker is taking the test and comes across a page with the section on it, they will see the skeleton HTML file the test designer designed with the ITS's section and question information embedded at the tag position in the page. The test taker will not have any idea as to what other ITS web pages look like and will feel that this test is unique. Having different skeleton files for different rest sections allows each test web page to appear differently. This field is case-sensitive and not required.

Skeleton For Break After Section (IF Any) • Enter the URL (a place on the web) or local file name where the 'skeleton [file]' used when the pause is presented to the test taker after the section part is given. Skeleton files are HTML files that contain key tag words embedded in the text. They allow the test designer to completely tailor what a test taker's web browser page will look like. Anything the test designer can put on a web page can be presented to the test taker. The ITS will read in the skeleton file and search for certain keywords. Upon finding the sequence of characters (in this case, "<!—<TEST>—>" (no quotation marks)) in the file, the ITS will substitute any data that it is responsible for providing. When a test taker is taking the test and comes to a break or pause part, they will see the skeleton HTML file the test designer designed with the ITS's pause information embedded at the tag position in the page. The test taker will not have any idea as to what other ITS web pages look like and will feel that this test is unique. Having different skeleton files for different pause parts allows each test web page to appear differently. It also allows for the test designer to place interesting and exciting breaks on a test. These breaks, which may be entertaining, "edutainment" or educational, may be multimedia clips, multicast material, of other information. This field is case-sensitive and not required.

Following For Progressive Tests Only Following For Progressive Tests Only • This message indicates that the remaining fields on the "Add Old Or Create New Test Sections" Screen only apply if the test type selected is 'progressive'. A 'Progressive' test (also known as "Adaptive" test) is a test where a new "part" of the test will be determined based solely on the answers put to the questions on the last test part given. That is, the test is not in a pre-determined order. The new test part is determined based on how well the test taker did in the previous part. In order to determine what part of the test is given next, the last part of the test is graded. If the score from the last test part is less than a certain 'passing score', then the test taker is given a certain test part. If the score from the last test part is equal to the 'passing score', a (possibly) different test part is given. If the score from the last test part is greater than the 'passing score', then another test part is given.

Section Passing Score (Blank=50) • This field determines the 'passing score' for a test part. When a progressive test is given, the new 'part' of the test is determined by the last section on the last part's passing score. The raw score for a part is the sum of all of the individual section raw scores, multiplied by their individual section weights:

$$\text{Part Raw Score} = (W1*S1) + (W2*S2) + \ldots *+(WN*S\ N)\dagger,$$

where WNN represents the weight of section 'N' and SN represents the raw score computed for section 'N' († only sections in the last part given are counted when computing the part raw score). This part raw score is then converted to a "part score" which has a value between the section low score and the section high score (see below). This conversion is done based on (relative to) the "highest" and "lowest" possible raw score for the test part (as determined by the point values of the individual questions). Passing score values are in the range between the section low score and the section high score (see below) and can be fractions. If nothing is entered, a default value of fifty will be assumed. This field is not required.

Section Low Score (Blank=0) • This field represents the lowest score that is possible for the last part of a test. When a progressive test is given, the score for the last part is computed (see above for details). This score is placed in the range from the section low score to the section high score. Only the last section on the last test part's section low score will be used when converting the part raw score to it's range. Leaving this field blank will yield a section low score of zero. Fractions are allowed. This field is not required.

Section High Score (Blank=100) • This field represents the highest score that is possible for the last part of a test. When a progressive test is given, the score for the last part is computed (see above for details). This score is placed in the range from the section low score to the section high score. Only the last section on the last test part's section high score will be used when converting the part raw score to it's range. Leaving this field blank will yield a section high score of one hundred. Fractions are allowed. This field is not required.

Section Order To Go To If >Passing Score (C-current, F-first, L-last, 1-first, 2-second, etc.) (Blank None/End Test) • This field represents the section (and therefore, part of the test) to go to if the last part of a progressive test's score is greater than the passing score. When a progressive test is given, the score for the last part is computed (see above for details). This score is placed in the range from the last test part's section low score to the last test part's section high score. This value is then compared with the last test part's section passing score. If the last part's score is greater than the passing score, then the new section (and, therefore, part) to be given on the test will be in the section order number placed in this field. If more than one section is in this place, then the section will be selected randomly from those in the same position. If nothing is entered, the test will end and a grade will be computed and displayed. Valid values are from one to the number of different section positions on the test. If 'C' is entered, then the current section order will be substituted for this value. If 'F' is entered, then the first position will be substituted for this value. If 'L' is entered, then the current last section position will be substituted for this value. If, in the future the position of the section pointed to by this value changes, this field will be updated to reflect this change automatically. This field is not required.

Section Order To Go To If <Passing Score (C-current, F-first, L-last, 1-first, 2-second, etc.) (Blank=None/End Test) • This field represents the section (and therefore, part of the test) to go to if the last part of a progressive test's score is less than the passing score. When a progressive test is given, the score for the last part is computed (see above for details). This score is placed in the range from the last test part's section low score to the last test part's section high score. This value is then compared with the last test part's section passing score. If the last part's score is less than the passing score, then the new section (and, therefore, part) to be given on the test will be in the section order number placed in this field. If more than one section is in this place, then the section will be selected randomly from those in the same position. If nothing is entered, the test will end and a grade will be computed and displayed. Valid values are from one to the number of different section positions on the test. If 'C' is entered, then the current section order will be substituted for this value. If 'F' is entered, then the first position will be substituted for this value. If 'L' is entered, then the current last section position will be substituted for this value. If, in the future, the position of the section pointed to by this value changes, this field will be updated to reflect this change automatically. This field is not required.

Section Order To Go To If=Passing Score (C-current, F-first, L-last, 1-first, 2-second, etc.) (Blank=None/End Test) • This field represents the section (and therefore, part of the test) to go to if the last part of a progressive test's score is equal to the passing score. When a progressive test is given, the score for the last part is computed (see above for details). This score is placed in the range from the last test part's section low score to the last test part's section high score. This value is then compared with the last test part's section passing score. If the last part's score is equal to the passing score. then the new section (and, therefore, part) to be given on the test will be in the section order number placed in this field. If more than one section is in this place, then the section will be selected randomly from those in the same position. If nothing is entered, the test will end and a grade will be computed and displayed. Valid values are from one to the number of different section positions on the test. If 'C' is entered, then the current section order will be substituted for this value. If 'F' is entered, then the first position will be substituted for this value. If 'L' is entered, then the current last section position will be substituted for this value. If, in the future, the position of the section pointed to by this value change, this field will be updated to reflect this change automatically. This field is not required.

Create • This button appears at the top and bottom of the field information for the section when creating a section. After the test designer has entered the required section information, press the Create button to create the section (a valid designer password is required). The results of creating the section will be displayed. If successful, the "Test And Section Information" Screen will appear, showing the newly created section. If unsuccessful, a message indicating what went wrong will appear and the test designer will have the option to press the "Back Button" in the browser to try again.

Erase Values • This button appears at the top and bottom of the field information for the section when creating a section. Press this button in order to erase the entries and start again.

Add Section from A Test Screen

This web page appears after the test designer clicks the Search Above Test For Section To Add button underneath the particular test the test designer wants to search (from the pull-down list box) on the top portion of the "Add Old Or Create New Test Sections" Screen. This page allows the test designer to add a previously designed section to the current test either by copying or linking it to the current test. This screen has the following elements:

View Current Test And Sections—This link appears near the top of the screen. When clicked on, the "Test And Section Information" Screen is presented.

Select One Of The X Section(s) On <Test Name> (Designer Logon ID) To Add • This message indicates the number of sections that are currently on the test from which the test designer wishes to add a previously designed section. Each section is then listed, in turn, with the following information:

Section Order #

Section Heading

Section Weight (Relative To 1.0)

Number Of Questions In Section

Min # Of Qs To Ask Per Diff Lvl

Max # Of Qs To Ask Per Diff Lvl

Question Order

Section Time Limit

Min Section Time

Time To Pause After Section

Min Time To Pause After Section

Skeleton For Section

Skeleton For Break After Section

Progressive Scores: Passing, Low, High

Next Section Orders (>, <and=)

For a discussion of these fields and their meaning, please refer to the discussion of "Add Old Or Create New Test Sections Screen" Screen, supra.

Link—This field appears to the right of the individual sections. When clicked on, it presents the "Link A Section From Another Test" Screen. From this screen, the test designer can 'link' in the section from this test to the current test. When the test designer 'links' in a previously designed section, the questions on it are not copied over to the new section being created. Instead, a reference to the previously designed section is made. Creating a reference (i.e., 'link') to the previously created section allows the questions to be maintained in one place and updated in both sections automatically.

Copy • This field appears to the right of the individual sections. When clicked on, it presents the "Copy A Section From Another Test" Screen. From this screen, the test designer can 'copy' the section and associated questions from this test to the current test. When the test designer 'copies' a previously designed section, the questions on it are duplicated (copied completely) over to the new section being created. Copying the previously created section over makes a completely new section with the same questions. Modifying the questions in one section has no effect on the questions in the other section (and visa-versa).

Questions • This link appears to the right for the individual sections. when clicked on,it presents the "Add Section From Another Test (Show Questions)" Screen. This screen allows the test designer to view the questions on another test and, thereby, helps the test designer make a decision whether or not the test designer wants to add this section to the current test. It is a "preview" of the questions that the new section would contain.

The test designer has A Total Of X Questions In Y Sections—This message follows the section information and indicates the number of questions in all of the sections listed above.

Link A Section from Another Test Screen

This web page appears after the test designer clicks the Link link to the right of the particular test section the test designer wants to create a reference to on the "Add Section From A Test" Screen. This page allows the test designer creates a new reference to the previously created section (this reference can be another reference to the same section) by specifying different parameters for the new section. It contains the exact same fields as described in the bottom portion of the "Add Old Or Create New Test Sections" Screen (i.e., the 'Create New Test Section' portion). We will only describe the differences in the buttons near the top and bottom of the screen. When the test designer 'links' in a previously designed section, the questions on it are not copied over to the new section being created. Instead, a reference to the previously designed section is made. Creating a reference (i.e., 'link') to the previously created section allows the questions to be maintained in one place and updated in both sections simultaneously. The screen includes the following elements. Refer To The "Add Old Or Create New Test Section" Screen for a list of fields and their meaning.

View Test Sections • This link appears at the top of the screen. When clicked on, it presents the "Test And Section Information" Screen. This screen allows the test designer to view and manipulate the current section information for a test.

Link • This button appears at the top and bottom of the field information for the new section. After the test designer has modified the required section parameter information, press the Link button to create a new section which refers to the previously created section (a valid designer password is required). The results of creating a link to the previously created section will be displayed If successful, the "Test And Section Information" Screen Will appear, showing the newly linked section with the changes. If unsuccessful, a message indicating what went wrong will appear and the test designer will have the option to press the "Back Button" in the browser to try again.

Reset Values • This button appears at the top and bottom of the field information for the new section. Press this button in order to reset the entries to their previous values and start again.

Copy A Section from Another Test Screen

This web page appears after the test designer clicks the Copy link to the right of the particular test section the test designer wants to copy on the "Add Section From A Test" Screen. This page allows the test designer to create a new copy of the previously created section and gives the test designer a chance to specify the parameters for the new section. It contains the exact same fields as described in the bottom portion of the "Add Old Or Create New Test Sections" Screen (i.e., the 'Create New Test Section' portion). We will only describe the differences in the buttons on the top and bottom of the screen. When the test designer 'copies' a previously designed section, the questions on it are duplicated (copied completely) over to the new section being created. Copying the previously created section over makes a completely new section with the same questions. Modifying the questions in one section has no effect on the questions in the other section (and visa-versa). This screen includes the following elements. Refer To The "Add Old Or Create New Test Section" Screen for a list of fields and their meaning.

View Test Sections • This link appears at the top of the screen. When clicked on, it presents the "Test And Section Information" Screen. This screen allows the test designer to view and manipulate the current section information for a test.

Copy • This button appears at the top and bottom of the field information for the new section. After the test designer has modified the required section parameter information, press the Copy button to create a new section and copy the previously designed section over (a valid designer password is required). The results of copying the previously created section will be displayed. If successful, the "Test And Section Information" Screen will appear, showing the newly copied section with the changes. If unsuccessful, a message indicating what went wrong will appear and the test designer will have the option to press the "Back Button" in the browser to try again.

Reset Values • This button appears at the top and bottom of the field information for the new section. Press this button in order to reset the entries to their previous values and start again.

Add Section from Another Test (Show Questions) Screen

This web page appears after the test designer clicks the Questions link to the right of the particular test section that the test designer wants to look at the questions of on the "Add Section From A Test" Screen. This page allows the test designer to view the questions on the section before adding the previously created section to the test. This screen includes the following elements:

X Question(s) Are In This Section • This message indicates the number of questions that are currently on the section from which the test designer wishes to add from. Each question is then listed in the relative order in which it would appear on a test, with the following information:

Question Number

Question

Question Type

Difficulty Level

Points For A Correct Answer

Points For A Wrong Answer

Points For No Answer

Choices In Order Of Appearance

View Test Sections • This link appears at the top and bottom of the questions for the section. When clicked on, it presents the "Test And Section Information" Screen. This screen allows the test designer to view and manipulate the current section information for a test.

Link • This link appears at the top and bottom of the questions for the section. When clicked on, it presents the "Link A Section From Another Test" Screen. From this screen, the test designer can 'link' in the section from this test to the current test. When the test designer 'links' in a previously designed section, the questions on it are not copied over to the new section being created. Instead, a reference to the previously designed section is made. Creating a reference (i.e., 'link') to the previously created section allows the questions to be maintained in one place and updated in both sections automatically.

Copy • This field appears at the top and bottom of the questions. When clicked on, it presents the "Copy A Section From Another Test" Screen. From this screen, the test designer can 'copy' the section and associated questions from this test to the current test. When the test designer 'copies' a previously designed section, the questions on it are duplicated (copied completely) over to the new section being created. Copying the previously created section over makes a completely new section with the same questions. Modifying the questions in one section has no effect on the questions in the other section (and visa-versa).

Modify Test Section Screen

This web page appears after the test designer clicks the Modify link to the right of the particular section the test designer wants to modify on the "Test And Section Information" Screen. This page allows the test designer to modify the test section by specifying different parameters for the section. It contains the exact same fields as described in the bottom portion (i.e., when creating a new section from scratch) of the "Add Old Or Create New Test Sections" Screen. We will only describe the differences between the top and bottom portions of the screen. This screen includes the following elements. Refer to the bottom portion of the "Add Old Or Create New Test Sections" Screen for a list of fields and their meaning.

View Test Sections • This link appears at the top of the screen. When clicked on, it presents the "Test And Section Information" Screen. This screen allows the test designer to view and manipulate the current section information for a test.

Modify • This button appears at the top and bottom of the field information for the section. After the test designer has modified the required section information, press the Modify button to modify the section parameters (a valid designer password is required). The results of modifying the section will be displayed. If successful, a message indicating so will appear. This will be followed by the "Test And Section Information" Screen, showing the section with the changes. If unsuccessful, a message indicating what went wrong will appear and the test designer will have the option to press the "Back Button" in the browser to try again.

Reset Values • This button appears at the top and bottom of the field information for the section. Press this button in order to reset the entries to their previous values and start again.

Delete Test Section Screen

This web page appears after the test designer clicks the Delete link to the right of the particular section the test designer wants to delete on the "Test And Section Information" Screen. This page allows the test designer to delete the section. The section information as well as all the questions and choices on it will be removed. If a section has been linked to, the question and choice information will remain, but the test section information will be deleted. This screen has the following elements:

View Test Sections • This link appears at the top of the screen. When clicked on, it presents the "Test And Section Information" Screen. This screen allows the test designer to view and manipulate the current section information for a test.

Password • Enter the current password in order to delete the test section for security reasons. The password must match that stored in the ITS in order for the test designer to delete the section. This field is case-sensitive and required.

Information About The Section The test designer is Going To Delete (Please Refer To The "Add Old Or Create New Test Sections" Screen For An Explanation Of Their Meaning):

Section Order (There Are X Sections)
Section Heading
Section Weight (Relative To Other Sections)
Question Order
Minimum # Of Questions Per Difficulty Lvl
Maximum # Of Questions Per Difficulty Lvl
Section time Limit (In Minutes)
Min Section Time (In Minutes)
Time To Pause After Section (In Minutes)
Min Time To Pause After Section
Section Introduction
Section Ending
Section Skeleton
Section Break Skeleton Delete • This button appears at the bottom of the screen. After the test designer has have entered the password, press the Delete button to delete the section (a valid designer password is required). The section and all associated information including any questions and choices will be removed. If this section has a link referring to it, the question and choice information will remain, but the test section information will be deleted. The outcome of deleting the section will be displayed. If successful, a message indicating so will appear. This will be followed by the "Test And Section Information" Screen, showing that the section has been removed. If unsuccessful, a message indicating what went wrong will appear and the test designer will have the option to press the "Back Button" in the browser to try again.

Reset Values • This button appears at the bottom of the screen. Press this button in order to reset the password and start again.

Select, Add or Create Test Questions Screen

This web page appears after the test designer clicks the Questions link to the right of the particular section the test designer wants to manipulate question information for on the "Test And Section Information" Screen. From this page, the test designer can view, modify and delete the section questions and choices. A test section may contain many questions. This screen allows the test designer to filter the questions that the test designer will manipulate. If it didn't exist, the test designer would be presented with a list of all the questions. If the test designer had hundreds of questions or even tens of questions on a section, this could take a while. Not only that, but after downloading the list of questions to the web browser, the test designer would still have to manually search for the question the test designer wanted to work on (this could take a while). This screen gives the test designer the capability to search for particular questions and narrow down the questions displayed. It is the main page from which all question manipulation occurs. This screen has the following elements:

Add New Question • This link appears at the top of the screen. When clicked on, it presents the "Add Old Or Create New Section Question" Screen. From this screen, the test designer can add new questions to the section.

View Test Sections • This link appears at the top of the screen. When clicked on, it presents the "Test And Section Information" Screen. This screen allows the test designer to view and manipulate the current section information for a test.

Go Back To Designer/Test Info • This link appears at the top of the screen. When clicked on, it presents the "Designer Information And Tests" Screen. From this screen, the test designer can manipulate the test designer information and the tests.

Search For Current Section Question(s) To Modify, Delete Or View Statistics • This line indicates that the test designer is searching the current test section for questions to manipulate. It allows the test designer to filter out undesired questions from the listing.

Enter The Word(s) That The Question(s) Contain Below . . . • This field allows the test designer to enter a sequence of characters used to search for particular questions. The characters the test designer enter must exactly match some portion of the question in order for the question to be found. Only exact matches will be found. HTML tags are important (the test designer must include all of the HTML tags in order for the question to be listed). Searching is not case sensitive. Entering nothing will match all questions in that section. (Entering Nothing Will Show A List Of ALL Section Questions). This line indicates that, if the test designer enters nothing in the field above, a list of all questions in the section will be displayed. Nothing is the default value unless the test designer types in an entry.

List Questions • This button, when clicked on, will search for questions that contain the same sequence of characters as those of the words typed above. Matches are not case sensitive and HTML tags are not ignored. If the test designer has an HTML tag embedded in the question, the test designer must type the same HTML tag for the search to be successful. The "List Of Section Questions" Screen will appear next, showing the list of questions found (or none if no matches were found).

Clear Values • Clicking on this button will erase any text entered in the search field and allow the test designer to create a new entry.

List of Section Questions Screen

This web page is the main entry point from where ALL question maintenance operations are performed. From this screen, the test designer can add, copy, modify, delete, and view statistics about the questions on the section. The web page lists the various questions the test designer has created (if any) along with simplified instructions for creating and manipulating questions. this screen includes the following elements:

We Found X Matching Question(s) In This Section • At the top of the screen will be a message indicating the number of questions the test designer currently found for this section.

Add New Question • This link appears near the top of the screen. Clicking on this link presents the "Add Old Or Create New Section Question" Screen. It allows the test designer to add a new question (either by 'creating' a new question or by 'copying' or 'linking' in an old question) to the section.

Search For Other Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Question List • A list of questions on the section (IF any) is presented. Each question has the following links underneath its information:

Modify Question
Delete Question
Question Statistics

Every question is listed with the following information:
Question
Question Type
Difficulty Level
Points For A "Correct" Answer
Points For A "Wrong" Answer
Points For "No" Answer.
Choices Available (with a star: '*', indicating that the choice is a possible answer)

For a complete discussion about the meanings of the above question parameters, please refer to the "Add Old Or Create New Section Question" Screen. Note that a '*' (star) next to a choice indicates that the choice is a correct choice (one of the possible answers). Questions and choices are listed in the relative order that they would appear in when given (if ignoring the difficulty level).

Modify Question • Clicking on this link presents the "Modify Your Test Question" Screen. It allows the test designer to modify the section question information.

Delete Question • Clicking on this link presents the "Delete Your Test Question" Screen. When the test designer wishes to remove the question from the section, clicking on this link will delete all of the question and choice information. Deleting a question will only remove the question permanently if it is not used in another test (or again in the same test). When the test designer adds a question from another test (or the same test), the test designer chooses whether to 'link' (i.e., create a 'reference' to) the question or to 'copy' the question and choice information over completely. If the test designer chooses choose to 'link' the question in, only one copy of the question exists and is shared. In this case, the questions on both of the tests are always the same and deleting one question will not remove the other question. It will only delete the reference to the question.

Question Statistics • Clicking on this link allows the test designer to view various statistics about the question. The next screen to appear will be "Question Statistics".

Add Old or Create New Section Question Screen

This web page appears after the test designer clicks the Add New Question link on the "List Of Section Questions" and "Select, Add Or Create Test Questions" Screens. This page allows the test designer to add a new question by either copying a previously designed question or creating an entirely new question. If creating a 'new' question, the test designer can specify parameters for the question on this web page. The top half of the screen allows the test designer to add a question from a previously created test. When the test designer adds a question, the test designer has two choices:

Copy the question and choices over to the new section completely

Link the question and choices over to the new section by creating a reference to the current question Creating a reference (i.e., 'link') to the previously created question allows the question to be maintained in one place and updated in all links automatically. Copying the previously created question over makes a completely new question with the same parameters and choices. Modifying the question in one copy has no effect on the question in the other copy (and visa-versa). If the test designer wishes to create a 'new' question, the test designer should only worry about the bottom portion of the "Add Old Or Create New Section Question" Screen. This screen has the following elements:

Search For Other Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Add Question From A Previously Created Test . . . • A drop-down list box will appear for this field. If the test designer is copying a previously designed question, select the test in which it exists.

Enter A Phrase That Is Part Of The Question . . . • This field allows the test designer to enter a sequence of characters used to search for particular questions. The characters the test designer enters enter must exactly match some portion of the question in order for the question to be found in the test being searched. Only exact matches will be found. HTML tags are important (the test designer must include all of the HTML tags in order for the question to be listed). Searching is not case sensitive. Entering nothing will match all questions in that test. (Entering Nothing Will Show A List Of ALL Test Questions). This line indicates that, if the test designer enters nothing in the field above, a list of all questions in the test will be displayed. Nothing is the default value unless the test designer types in an entry.

Search Above Test For Question To Add • After selecting a test from the pull-down list box, click on this button to go to the "Add Question From Another Test" Screen.

OR • This key word, "OR", separates the 'add' previously designed question part of the web page from the 'create' a new section question part.

Enter Your New Section Question And Choice Information And Press 'Create' (Note: Items Marked With '*' Are Optional (Default Values Will Be Used) • These two lines are the heading which appears before the test designer is prompted with parameters about the question the test designer wishes to create.

Create • This button appears at the top and bottom of the field information when creating a new question. After the test designer has entered the required question information, press the Create button to create the question (a valid designer password is required). The results of creating the question will be displayed. If successful, a message indicating so will appear. The "Select, Add Or Create Test Questions" Screen will follow, allowing the test designer to search for questions. If unsuccessful, a message indicating what went wrong will appear and the test designer will have the option to press the "Back Button" in the browser to try again.

Erase Values • This button appears at the top and bottom of the field information when creating a new question. Press this button in order to erase the entries and start again.

Password • Enter the current password for security reasons. The password must match that stored in the ITS in order for the new question to be created. This field is case-sensitive and required for creating a new question.

Question Order (F-first, L-last, 1-first, 2-second, etc.) • The question order fields represent the order (i.e., the position relative to the other questions on the section) which the test designer wants the question to appear in. Questions within the same section cannot be placed in the same position (i.e., they can not have the same order number within the section). Entering a value indicates what position the question should be inserted into. 'F' indicates that the question should be inserted in the first position (the same as entering the number one). 'L' indicates that the question should be inserted after the current last question in the section.

Question (HTML Tags OK) • This field represents the actual question displayed on the section. It is the focal point for a test (after all, a test must have at least one question on it or why give it?). The question can be anything the test designer wants. HTML tags can be embedded into the question and will be displayed as they would in a standard web browser when given on a test. Embedding HTML tags in questions give the test designer the opportunity to create new, dynamic, and interesting types of questions. Questions can be tailored to the needs and are unlimited in concept (they are only limited by the web and the test designer's imagination). For example, unique questions can be given which contain movies, pictures or songs. Hypertext links can be embedded in the question that takes the test designer to other places on the web. This can be used as a way to learn about the information necessary to answer the question. By creating a test where every question has a hyper-text link which takes the test designer to some part of a text book (i.e., by using a "Test-Centric" learning approach), the test designer can create a "Test a Centric" (also known as "Test-Centered") test. This is a test which first gives the questions at the end of a chapter in a textbook. The test taker reads about how to answer the question by clicking on a link embedded in the question. This has the effect of motivating the student or test taker to learn about the subject matter of the question before reading the material. Test takers who already know about the information can simply answer the question directly without clicking on the link. The Question field is not case-sensitive and required.

Explanation (HTML Tags OK) (Reason For Answer) • This field represents an explanation to the logic of the question. It gives the test designer the opportunity to explain or show why an answer to the question is correct or incorrect. It also gives the test designer the opportunity to discuss anything about the question that is relevant. The explanation will when the answers to the questions on a test are displayed (if allowed at all). It appears as a hyper-text link next to the question when showing the answers. By clicking on this link, the explanation is displayed in the browser. Embedding HTML tags in explanations is allowed. This gives the test designer the opportunity to create new, dynamic, and interesting types of explanations. Explanations can be tailored and are unlimited in concept (they are only limited by the web and the test designers imagination). For example, explanations can contain movies, pictures or voice clips indicating the logic of the question. An instructor can be displayed lecturing about why the answer to the question is justified. Hyper-text links can be embedded in the explanation which take the test designer to other places on the web to learn more about the material. This can be used as a way to learn more about the material of the question and can serve to reinforce the theoretical principles behind the question. It should be remembered that tests exist as a way to learn and better yourself as well as the means to learn about the skills of someone. Using HTML tags in questions and explanations gives a new way for the test designer to teach. Be imaginative and create interesting and informative tests. The Explanation field is not case-sensitive and not required.

Type Of Question • This field represents the kind of question the test designer wants to give. There are a number of different types of questions:

Multiple Choice, One Correct Answer

Multiple Choice, One Or More Correct Answers

Multiple Choice, Zero Or More Correct Answers

Fill-In-The-Blank "Multiple Choice, One Correct Answers" is a multiple-choice question which has exactly one correct answer. A question is considered "correct" if the correct choices is selected and none of the incorrect choices are selected; "wrong" if the correct choice is not selected or any of the incorrect choices are selected; and "no answer" if no choice is selected by the test taker.

"Multiple Choice, One Or More Correct Answers" is a multiple-choice question which has at least one correct answer. A question is considered "correct" if all of the correct choices are selected and none of the incorrect choices are selected; "wrong" if any of the correct choices are not selected or any of the incorrect choices are selected; and "no answer" if no choice is selected by the test taker. This type of question indicates to the test taker that one answer is correct. The test taker still has to know which of the choice(s) are correct. This makes it more challenging than having only one correct answer for a question.

"Multiple Choice, Zero Or More Correct Answers" is a multiple-choice question which has zero or more correct answers. A question is considered "correct" if all of the correct choices (if any) are selected and none of the incorrect choices (if any) are selected; "wrong" if any of the correct choices are not selected or any of the incorrect choices are selected; and "no answer" if no choice is selected by the test taker. Having this type of question challenges the test taker more than the other types of questions. It doesn't give the test taker any information about whether at least one choice must be right or not.

"Fill-In-The-Blank" is a type of question where the test taker is prompted for an answer to type into a box. A question is considered "correct" if the answer entered by the test taker matches any of the choices (if any); "wrong" if the answer entered by the test taker doesn't match any of the choices (if any); and "no answer" if nothing is entered by the test taker. Using this type of question doesn't give any clue to the test taker as to what the correct answer may be. The test taker is required to put the answer into the box themselves.

Points If Correct • This field represents the number of points the test designer wants to award for this question for a "correct" answer. Fractions and negative values are allowed. A negative value indicates that the test designer wants to penalize (assuming scores range from a lesser value to a higher value and that a higher value is more desirable) the test taker if they answer the question correctly. This field is required.

Points If Wrong • This field represents the number of points the test designer wants to award for this question for a "wrong" answer. Fractions and negative values are allowed. A negative value indicates that the test designer wants to reward (assuming scores range from a lesser value to a higher value and that a higher value is more desirable) the test taker if they answer the question incorrectly. This field is required.

Points If No Answer Given • This field represents the number of points the test designer wants to award for this question when no answer is placed for the question. Fractions and negative values are allowed. This field is required and must range from the Points If Correct value to the Points If Wrong value. If the test designer wishes a "no answer" answer to be considered "wrong" (i.e., have the same point value as being wrong), then place the same value as the Points If Wrong value. If the test designer wishes a "no answer" to be considered "right", then place the same value as the Points If Right value.

Give Choices To Question In Random Order? (Versus Sequential Order) • This field determines how the choices to a question should appear. If checked, it indicates that the choices to the question should appear in a random order for the question. If unchecked, the order the choices appear in will be the same as listed in the bottom portion of the screen. This field is Difficulty Level (0–255/Blank) • This field indicates the relative importance of the question as compared to other questions in the same section. Questions with the same difficulty level are considered "equivalent" in hardness. The difficulty level can be used to determine the order in which the questions will appear in a section (refer to the discussion of question order in the "Add Old Or Create New Test Sections" Screen. Only integral or blank values are allowed. Blank values are the same as numeric difficulty levels in that they are considered another level. This field is required.

List Choices In Order Of Appearance (Hint: The test designer can Copy And Paste Values) • This message indicates that the choice information for the question will follow. HTML tags can be embedded in the choices for a question and will appear as what they would have appeared like if placed in a web browser. None of the choice fields are required. The test designer can give a question with no choices.

Correct Choice/Possible Answer?; Actual Choice Value • These two fields are optional, but must be entered in pairs (i.e., the test designer can't enter one field without having a corresponding value in the other). The test designer can enter up to ten choices for a question. The choices are presented to the test taker when the question is displayed on the test (except for "fill-in-the-blank" type questions). The test taker will select answer(s) from these choice(s). A check mark in the Correct Choice/Possible Answer? field indicates that this choice is considered a "correct" choice. Leaving this box unchecked indicates that this choice is considered an "incorrect" choice. The actual choice is entered in the Actual Choice Value field.

Add Question from Another Test Screen

This web page appears after the test designer clicks the Search Above Test For Question To Add button underneath the particular test the test designer wants to search (from the pull-down list box) on the top portion of the "Add Old Or Create New Section Question" Screen. This page allows the test designer to add a previously designed question to the current section either by copying or linking it to the current section. This screen has the following elements:

Look At Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section. information for a test.

Go Back To Designer/Test Info • This link appears near the top of the screen. When clicked on, it presents the "Designer Information And Tests" Screen. From this screen, the test designer can manipulate the test designer information and the tests.

Please Choose One Of The X Question(s) On <Test Name>(<Test Identifier>) To Add To Your Section . . . • This messages indicates the number of questions meeting the search criteria that are currently on the test from which the test designer wishes to add a previously designed question. Each question is then listed, in turn, with the following information:

Question

Question Type

Difficulty Level

Points For A "Correct" Answer

Points For A "Wrong" Answer

Points For "No" Answer

Choices Available (with a star: '*', indicating that the choice is a possible answer)

For a complete discussion about the meanings of the above question parameters, please refer to the "Add Old Or Create New Section Question" Screen, supra. Note that a '*' (star) next to a choice indicates that the choice is a correct choice (one of the possible answers). Questions and choices are listed in random order (no correspondence to the order that they would appear in when given).

Link Question • This field appears to the right of each individual question listed. When clicked on, it presents the "Link A Question From A Test" Screen. From this screen, the test designer can 'link' in the question from this test to the current section. When the test designer 'links' in a previously designed question, the question is not copied over to the new question being created. Instead, a reference to the previously designed question is made. Creating a reference (i.e., 'link') to the previously created question allows the question to be maintained in one place and updated in all questions that refer to it automatically.

Copy Question • This field appears to the right of each individual question listed. When clicked on, it presents the "Copy A Question From A Test" Screen,From this screen, the test designer can 'copy' the question and associated choices from this test to the current section. • When the test designer 'copies' a previously designed question, the question is duplicated (copied completely) over to the new question being created. Copying the previously created question over makes a completely new question with the same choices. Modifying the question has no effect on the other question from which it was copied (and visa-versa).

Link A Question from A Test Screen

This web page appears after the test designer clicks the Link Question link to the right of the particular test question the test designer wants to create a reference to on the "Add Question From Another Test" Screen. This page allows the test designer to create a new reference to a previously created question (this reference can be another reference to the same question within the same section) by specifying different parameters for the new question. It contains the exact same fields as described in the bottom portion of the "Add Old Or Create New Section Question" Screen (i.e., the 'Create New Test Question' portion). We will only describe the differences in the buttons near the top and bottom of the screen. When the test designer 'links' in a previously designed question, the question is not copied over to the new question being created. Instead, a reference to the previously designed question is made. Creating a reference (i.e., 'link') to the previously created question allows the question to be maintained in one place and updated in all references simultaneously. This screen has the following elements. Refer to the "Add Old Or Create New Section Question" Screen for a list of fields and their meaning.

Look At Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Link • This button appears at the top and bottom of the field information for the new question. After the test designer has modified the required question parameter information, press the Link button to create a new question which refers to the previously created question (a valid designer password is required). The results of creating a link to the previously created question will be displayed. If successful, the "Select, Add Or Create Test Questions" Screen will appear, showing the newly linked question with the changes. If unsuccessful, a message indicating what went wrong will appear and the test designer will have the option to press the "Back Button" in the browser to try again.

Reset Values • This button appears at the top and bottom of the field information for the new question. Press this button in order to reset the entries to their previous values and start again.

Copy A Question from A Test Screen

This web page appears after the test designer clicks the Copy Question link to the right of the particular test question the test designer wants to copy on the "Add Question From Another Test" Screen. This page allows the test designer to create a new copy of the previously created question and gives the test designer a chance to specify the parameters for the new question. It contains the exact same fields as described in the bottom portion of the "Add Old Or Create New Section Question" Screen (i.e., the 'Create New Test Question' portion). We will only describe the differences in the buttons on the top and bottom of the screen. When the test designer 'copies' a previously designed question, the question is duplicated (copied completely) over to the new question being created. Copying the previously created question over makes a completely new question with the same choices. Modifying the question has no effect on the question in the other test (and visa-versa). This screen has the following elements. Refer to the "Add Old Or Create New Section Question" Screen for a list of fields and their meaning.

Look At Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Copy • This button appears at the top and bottom of the field information for the new question. After the test designer has modified the required question parameter information, press the Copy button to create a new question and copy the previously designed question over (a valid designer password is required). The results of copying the previously created question will be displayed. If successful, the "Select, Add Or Create Test Questions" Screen will appear, showing the newly copied question with the changes. If unsuccessful, a message indicating what went wrong will appear and the test designer will have the option to press the "Back Button" in the browser to try again.

Reset Values • This button appears at the top and bottom of the field information for the new question. Press this button in order to reset the entries to their previous values and start again.

Modify Your Test Question Screen

This web page appears after the test designer clicks the Modify Question underneath the particular question the test designer wants to modify on the "List Of Section Questions" Screen. This page allows the test designer to modify the section question by specifying different parameters for the question. It contains the exact same fields as described in the bottom portion (i.e., when creating a new question from scratch) of the "Add Old Or Create New Section Question" Screen. We will only describe the differences between the top and bottom portions of the screen. This screen includes the following elements. Refer to the bottom portion of the "Add Old Or Create New Section Question" Screen for a list of fields and their meaning.

Look At Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Modify • This button appears at the top and bottom of the field information for the question. After the test designer has modified the required question and choice information, press the Modify button to modify the question parameters (a valid designer password is required). The test designer can add more choices to the question or take some away simply by placing new choices in the boxes or removing the text of the old ones. The results of modifying the question will be displayed. If successful, a message indicating so will appear. This will be followed by the "Select, Add Or Create Test Questions" Screen, showing the question with the changes. If unsuccessful, a message indicating what went wrong will appear and the test designer will have the option to press the "Back Button" in the browser to try again.

Reset Values • This button appears at the top and bottom of the field information for the question. Press this button in order to reset the entries to their previous values and start again.

Delete Your Test Question Screen

This web page appears after the test designer clicks the Delete Question link underneath the particular question the test designer wants to delete on the "List Of Section Questions" Screen. This page allows the test designer to delete the question. The question information as well as all the choices for it will be removed. If a question has been linked to, the question and choice information will remain for the other test using the question, but the section question information will be deleted. This screen includes the following elements:

Look At Questions • This link appears near the top of the screen. When clicked on, it presents the "Select, Add Or Create Test Questions" Screen. This screen allows the test designer to search for questions to manipulate.

View Test Sections • This link appears near the top of the screen. When clicked on, it presents the "Test And Section Information" Screen. This screen allows the test designer to view and manipulate the current section information for a test.

Go Back To Designer/Test Info • This link appears near the top of the screen. When clicked on, it presents the "Designer Information And Tests" Screen. From this screen, the test designer can manipulate the test designer information and the tests.

Password • Enter the current password in order to delete the section question for security reasons. The password must match that stored in the ITS in order for the test designer to delete the question. This field is case-sensitive and required.

Information About The Question The Test Designer is Going To Delete (Refer to the "Add Old Or Create New Section Question" Screen for an explanation of their meaning):

Question

Question Type

Difficulty Level

Points For A "Correct" Answer

Points For A "Wrong" Answer

Points For "No" Answer

Choices Available

Question Explanation

Delete • This button appears at the bottom of the screen. After entering the password, press the Delete button to delete the question (a valid designer password is required). The question and all associated choice information will be removed. If this question has a link referring to it in another test (or the same test), the question and choice information will remain in the database, but the test question information will be deleted from the section. The outcome of deleting the question will be displayed. If successful, a message indicating so will appear. This will be followed by the "Select, Add Or Create Test Questions" Screen, allowing the test designer to search for other questions to manipulate (and to verify that the question has been removed if the test designer wants). If unsuccessful, a message indicating what went wrong will appear and the test designer will have the option to press the "Back Button" in the browser to try again.

Reset Values • This button appears at the bottom of the screen. Press this button in order to reset the password and start again.

Your Personal Test Takers Screen

This web page appears after the test designer clicks the Administer Test Takers link on the top of the "Designer Information And Tests" Screen. This page allows the test designer to create, maintain and send email to test taker accounts. It is the main screen for administering the test takers. Test takers are the people who are eligible to take any of the tests that the test designer creates. The test designer sets up accounts for them by using this screen. Once an account has been set up for a test taker, however, doesn't mean that they can automatically take the test. In order for them to be allowed to take the test, the test taker account must be manually assigned to take a particular test. Refer to the Takers link on the "Designers Information And Tests" Screen for more information about this link. In this way, test takers can be assigned to take the same test multiple times or different tests without the need to re-enter their personal information. This screen includes the following elements:

Create New Taker • This link appears near the top of the screen. When clicked on, it presents the "Create A New Test Taker" Screen which allows the test designer to create a new test taker account.

Show Designer Info • This link appears near the top of the screen. When clicked on, it presents the "Designer Information And Tests" Screen. From this screen, the test designer can manipulate the test designer information and the tests.

<TEST DESIGNER NAME> Has Created X Test Takers • This message indicates the total number of test taker accounts (if any) that the test designer has created. It contains a link <TEST DESIGNER NAME> that, when clicked on, presents the "Designer Information And Tests" Screen. From this screen, the test designer can manipulate the test designer information and the tests. These test taker accounts are listed in the list (scroll) box in between the two sets of buttons that follow. The list (scroll) box shows all of the test taker accounts with the following information:

Test Taker (User) Name

Test Taker Logon ID (appears in parentheses)

Total Number Of Tests Allowed To Take

The buttons described below appear twice: once above the list (scroll) box showing the test taker accounts the test designer has created, and once below the list (scroll) box.

View • This button appears above and below the list (scroll) box. When clicked, it presents the "Test Taker View" Screen which allows the test designer to look at the information for a particular test taker account.

Modify • This button appears above and below the list (scroll) box. When clicked, it presents the "Test Taker Modify" Screen which allows the test designer to view and change the information for a particular test taker account.

Delete • This button appears above and below the list (scroll) box. When clicked, it presents the "Test Taker Delete" Screen which allows the test designer to delete a particular test taker account (and any associated test results and assignments).

Email • This button appears above and below the list (scroll) box. When clicked, it presents the "Test Taker Email" Screen which allows the test designer to send email to a particular test taker account (only if the test taker has an email address). This feature allows the test designer to contact a test taker for any particular reason the test designer may have (i.e., test results, disputes, etc.).

Become • This button appears above and below the list (scroll) box. When clicked, it presents the "Test Taker Become" Screen (also known as the "Test Taker Information And Tests Allowed To Take" Screen). In essence, the test designer becomes become the test taker and can view information from the standpoint of the test taker (i.e., the test designer can take tests, email test designers and view the test results as if the test designer were that particular test taker). The designer password is valid for any information which requires that test taker's password when the test designer becomes that test taker. The test designer is only allowed to become test takers that the test designer created.

Statistics • This button appears above and below the list (scroll) box. When clicked, it presents the "Test Taker Statistics" Screen which allows the test designer to view statistics about a particular test taker's account.

Delete Test Results • This button appears above and below the list (scroll) box. When clicked, it presents the "Test Taker Delete Test Results" Screen that allows the test designer to delete all of the test taker's results from previous tests taken. To delete individual tests, refer to the "Test Takers Assigned To Take This Test" Screen which appears when manipulating test takers for a particular test.

Create A New Test Taker Screen

This web page appears after the test designer clicks click the Create New Taker link at the top of the "Your Personal Test Takers" Screen. This page allows the test designer to add a new test taker account and set test taker privileges. Test taker accounts are those accounts in the ITS which allow a person to take a test. Test taker accounts can be "fictitious" (template) accounts whose sole purpose of existence is to let people take the test that the test designer doesn't yet know about (i.e., for surveys and trivia quizzes). This screen includes the following elements:

Designer Password • Enter the current designer password for security reasons. The password must match that stored in the ITS in order for test taker account to be created. This field is case-sensitive and required.

Skeleton For Logging On To Take Test (Local File Name <!—<TEST>—>) • Enter the URL (a place on the web) or local files name where the 'skeleton [file]' used when the test taker logs on to view their test results or to take their test. Skeleton files are HTML files that contain key tag words embedded in the text. They allow the test designer to completely tailor what a test taker's web browser page will look like. Anything the test designer can put on a web page can be shown to the test taker. The ITS will read in the skeleton file and search for certain keywords. Upon finding the sequence of characters (in this case, "<!—<TEST>—>" (no quotation marks)) in the file, the ITS will substitute any data that it is responsible for providing. When a test taker goes to 'log on' to maintain their test account, they will see the skeleton HTML file the test designer designed with the ITS's screen information embedded at the tag position in the page. The test taker will not have any idea as to what other ITS web pages look like and will feel that their account is unique. This field is case-sensitive and not required.

Maximum # Of Tests Can Take (Blank=>Unlimited) • Enter the maximum number of tests (limit) that this test taker should be allowed to take. This field must be greater than or equal to zero or blank. Blank values indicate that this test taker account should not have any restrictions on the number of tests they are allowed to take. This field is not required.

Test Taker Information • This phrase indicates that this section of the page refers to information solely about the test taker themselves.

Password (Enter Twice) • Enter the initial test taker account password in both boxes. This is necessary to verify that the test designer typed in the password correctly. The test taker can later change their own password if their account has permission to do so. The information entered is case-sensitive. These fields are required (however, this doesn't mean that the test designer has to check for passwords when giving a test . . . refer to "Assign Test Taker(s) To Take Your Test" Screen for more information).

Logon ID • Enter the test taker account logon identifier. It must be unique among all of the test taker accounts. This field is used to uniquely identify a test taker account when they log into the ITS system. For students, this might be the student's identification number (student ID #) or social security number (SSN). It is case-insensitive and required (however, this doesn't mean that the test designer has to check for logon IDs when giving a test . . . refer to "Assign Test Taker(s) To Take Your Test" Screen for more information).

Name • Enter the full name of the test taker. This field is case-insensitive and not required.

Phone Number • Enter the phone number of the test taker. This field only allows numbers, parentheses ('(' and ')'), and dashes ('-'). It is not required.

E-Mail Address • Enter the email address of the test taker. Values are of the form: <user name>@<host name>.<domain name>. This field is case-insensitive and not required.

Address, Line #1, Address, Line #2 • Enter the first and second lines of the test taker's address. These fields are case-insensitive and are not required.

City • Enter the city where the test taker lives. This field is case-insensitive and not required.

State • Enter the state where the test taker lives from the pick-list. This field is case-insensitive and not required.

Zipcode • Enter the zip code where the test taker lives. This field is case-insensitive and not required.

Fax Number • Enter the fax number of the test taker. This field is case-insensitive and not required.

Test Taker Logon Information • This phrase indicates that a table showing what fields a test taker can view or modify when they log on to their account follows. The table is split into three columns. The first column lists the field that the other two columns of information pertain to. This column is labeled "Affected Field"• It has no input and is just for displaying the field name:

Taker Logon ID

Password

Name

Phone Number

E-Mail Address

Address, Line #1

Address, Line #2

City

State

Zipcode

Fax Number

The second column is a set of check boxes. These check boxes determine what fields a test taker sees after logging on to their ITS account. If a check box is checked, the test taker can view the field listed in the first column described above. If the check box is not checked, the test taker will not be able to see their information after logging on to the ITS. Passwords are an exception. They don't have a check box (the value is marked as "Not Applicable": N/A). This indicates that passwords are never displayed for security reasons. However, the test taker can still modify their password of they have the right permission (see below). This column is labeled "When Test Taker Logs On Fields Are Viewable". The default value for these fields is checked, meaning that the test taker is allowed to view all of their information when they log in to their account (except for the password field that is always not viewable). These fields are required. The third column is also a set of check boxes. These check boxes determine what fields (if any) a test taker can change after logging on to their ITS account. If a check box is checked, the test taker can modify the field listed in the first column described above. If the check box is not checked, the test taker will not be able to modify their information after logging on to the ITS. This column is labeled "When Test Taker Logs On Fields Are Modifiable". The default value for all of the fields except the password field is not checked, meaning that the test taker is not allowed to modify the account information. However, the password is checked, meaning that the test taker may change it. These fields are required.

Create • This button appears at the top and bottom of the field information for the screen. After the test designer has entered the required information above, press this button to create the test taker account. The results of adding a new test taker account will be displayed. If successful, the "Your Personal Test Takers" Screen will appear listing the newly created test taker account. If unsuccessful, a message indicating what went wrong will appear and the test designer will have the option to press the "Back Button" in the browser to try again.

Erase Values • Press this button in order to discard the entries and start over.

Test Taker View Screen

This web page appears after the test designer clicks the view button on the "Your Personal Test Takers" Screen. This page allows the test designer to view a test taker account's current information. Test takers are the people who are eligible to take any of the tests that the test designer creates create. The test designer sets set up accounts for them by using this screen. Once an account has been set up for a test taker, however, doesn't mean that they can automatically take the test. In order for them to be allowed to take the test, the test taker account must be manually assigned to take a particular test. Refer to the Takers link on the "Designers Information And Tests" Screen for more information about this link. In this way, test takers can be assigned to take the same test multiple times or different tests without the need to re-enter their personal information. Please refer to the "Create A New Test Taker" Screen for a description of the fields of information which are listed on this screen. Only the fields which are different than those on the "Create A New Test Taker" Screen and the buttons and links which appear on this screen are described below.

Create New Taker • This link appears near the top of the screen. When clicked on, it presents the "Create A New Test Taker" Screen which allows the test designer to create a new test taker account.

Show Designer • This link appears near the top of the screen. When clicked on, it presents the "Designer Information And Tests" Screen. From this screen, the test designer can manipulate the test designer information and the tests.

Show Test Takers • This link appears near the top of the screen. When clicked on, it present the "Your Personal Test Takers"Screen. From this screen, the test designer can manipulate the test taker accounts.

Modify • This button appears above and below the test taker information. When clicked, it presents the "Test Taker Modify" Screen which allows the test designer to view and change the information for a particular test taker account.

Delete • This button appears above and below the test taker information. When clicked, it presents the "Test Taker Delete" Screen which allows the test designer to delete this particular test taker's account (and any associated test results and assignments).

Email • This button appears above and below the test taker information. When clicked, it presents the "Test Taker Email" Screen which allows the test designer to send email to this particular test taker account (only if this test taker has an email address). This feature allows the test designer to contact this test taker for any particular reason the test designer may have (i.e., test results, disputes, etc.).

Become • This button appears above and below the test taker information. When clicked, it presents the "Test Taker Become" Screen (also known as the "Test Taker Information And Tests Allowed To Take" Screen). In essence, the test designer becomes this test taker and can view information from the standpoint of this test taker (i.e., the test designer can take tests, email test designers and view the test results as if the test designer were that particular test taker). The designer password is valid for any information that requires this test taker's password when the test designer becomes this test taker. The test designer is only allowed to become test takers that the test designer created.

Statistics • This button appears above and below the test taker information. When clicked, it presents the "Test Taker Statistics" Screen which allows the test designer to view statistics about this particular test taker's account.

Not Assigned To Take Any Tests • This line indicates the number of tests (if any) the test taker is currently assigned to take. Following this line are fields of information about the test taker account:

Maximum Number Of Tests
    Skeleton File When Log On (Contains <!—<TEST>—> Tag)
    Logon ID
    Name
    Last Log On (Date And Time)
    Number Of Failed Logon Attempts
    Phone Number
    E-Mail Address
    Address, Line #1
    Address, Line #2
    City
    State
    Zipcode
    Fax Number
    Whether Fields Above Are Viewable When Test Taker Logs On To ITS
    Whether Fields Above Are Modifiable By Test Taker When Test Taker Logs On To ITS The fields above which are not described in the "Create A New Test Taker" Screen are:

Last Log On (Date And Time): Shows the last date and time a test taker successfully logged on to the ITS.
    Number Of Failed Logon Attempts: Shows the number of times a test taker attempted to log on to the ITS unsuccessfully (since the last successful time).

Test Taker Modify Screen

This web page appears after the test designer clicks the Modify button on both the "Your Personal Test Takers" Screen and "Test Taker View" Screen. This page allows the test designer to modify the test taker account information by specifying different parameters for the test taker account. It contains the exact same fields as described in the "Create A New Test Taker" Screen. We will only describe any differences between the fields, links and buttons between the two screens. This screen includes the following elements. Refer to the "Create A New Test Taker" Screen for a list of fields and their meaning.

Show Designer • This link appears near the top of the screen. When clicked on, it presents the "Designer Information And Tests" Screen. From this screen, the test designer can manipulate the test designer information and the tests.

Show Test Takers • This link appears near the top of the screen. When clicked on, it presents the "Your Personal Test Takers" Screen. From this screen, the test designer can manipulate the test taker accounts.

Designer Password • Enter the current designer password for security reasons. The password must match that stored in the ITS in order for test taker account to be modified. This field is case-sensitive and required.

Not Assigned To Take Any Tests • This line indicates the number of tests (if any) the test taker is currently assigned to take. Following this line are fields of information about the test taker account:

Maximum Number Of Tests Can Take
    Skeleton File When Log On (Contains <!—<TEST>—> Tag)
    Password • Enter Twice only If Changing Password
    LogonID
    Name
    Last Log On (Date And Time) • Leave Blank To Indicate Current Date/Time
    Number Of Failed Logon Attempts
    Phone Number
    E-Mail Address
    Address, Line #1
    Address, Line #2
    City
    State
    Zipcode
    Fax Number
    Whether Fields Above Are Viewable When Test Taker Logs On To ITS
    Whether Fields Above Are Modifiable By Test Taker When Test Taker Logs On To ITS The fields above which are not described in the "Create A New Test Taker" Screen are:

Last Log On (Date And Time) • Shows the last date and time a test taker successfully logged on to the ITS. The test designer can modify this field to update this entry. This field is required
    Number Of Failed Logon Attempts • Shows the number of times a test taker attempted to log on to the ITS unsuccessfully (since the last successful time). The test designer can modify this field and update this entry. A test taker is allowed to have X number of logon attempts. After failing to log on X number of times, their account is "locked out". This means that they have to wait N minutes until they can try to log on again (for security reasons). By resetting this value to a value less than X, the test designer can manually allow them to log on to their account without waiting N minutes. This field is required.

Modify • This button appears at the top and bottom of the field information for the test taker account. After the test designer has modified the required test taker account information, press the Modify button to modify the test taker account parameters (a valid designer password is required). The results of modifying the test taker account will be displayed. If successful, the "Your Personal Test Takers" Screen will appear, showing the test taker account with the changes. If unsuccessful, a message indicating what went wrong will appear and the test designer will have the option to press the "Back Button" in the browser to try again.

Reset Values • This button appears at the top and bottom of the field information for the test taker account. Press this button in order to reset the entries to their previous values and start again.

Test Taker Delete Screen

This web page appears after the test designer clicks the Delete button on both the "Your Personal Test Takers" Screen and "Test Taker View" Screen. This page allows the test designer to delete the test taker account. All the test taker account information as well as all the test results and test assignments for that test taker will be removed. This screen includes the following elements. Refer to the "Create A New Test Taker" Screen for a list of fields and their meaning.

Show Designer • This link appears near the top of the screen. When clicked on, it presents the "Designer Information And Tests" Screen. From this screen, the test designer can manipulate the test designer information and the tests.

Show Test Takers • This link appears near the top of the screen. When clicked on, it presents the "Your Personal Test Takers" Screen. From this screen, the test designer can manipulate the test taker accounts.

Designer Password • Enter the current designer password for security reasons. The password must match that stored in the ITS in order for test taker account to be modified. This field is case-sensitive and required.

Not Assigned To Take Any Tests • This line indicates the number of tests (if any) the test taker is currently assigned to take. Following this line are fields of information about the test taker account:

Maximum Number Of Tests Can Take

Skeleton File When Log On (Contains <!—<TEST>—> Tag)

Logon ID

Name

Phone Number

E-Mail Address

Address, Line #1

Address, Line #2

City

State

Zipcode

Fax Number

Whether Fields Above Are Viewable When Test Taker Logs On To ITS

Whether Fields Above Are Modifiable By Test Taker When Test Taker Logs On To ITS Delete • This button appears at the top and bottom of the test taker information. After the test designer has entered the password, press the Delete button to delete the test taker account (a valid designer password is required). The test taker account and all associated information including any test results and test assignments will be removed. The outcome of deleting the test taker account will be displayed. If successful, the "Your Personal Test Takers" Screen will appear, showing that the test taker account has been removed. If unsuccessful, a message indicating what went wrong will appear and the test designer will have the option to press the "Back Button" in the browser to try again.

Cancel • This button appears at the top and bottom of the test taker information. Press this button in order to cancel the delete operation and return to the "Your Personal Test Takers" Screen.

Test Taker Email Screen

This web page appears after the test designer clicks the Email button on both the "Your Personal Test Takers" Screen and "Test Taker View" Screen. This page allows the test designer to send email to the test taker. No password is required. This screen includes the following elements. Refer to the "Create A New Test Taker" Screen for a list of fields and their meaning.

Enter The Information In The Form Below And Then Send The Email To The Test Taker By Pressing 'Send' • This message indicates what to do in order to send email to the test taker. Following this message, the test taker account information is displayed for the reference:

LogonID

Name

Phone Number

E-Mail Address

Address, Line #1

Address, Line #2

City

State

Zipcode

Fax Number

Message For Test Taker • This field indicates the email message the test designer wishes to send to the test taker. It can be anything the test designer desires and is required (why else send a message if the test designer doesn't have a message to send?).

By default, the following is always included in the message:

Message From <Test Designer Name> (Email: <Test Designer Email Address>)

Date/Time Of Message: Oct. 1, 1997 9:57:36 AM

Message:
    <Message Content>

The first line indicates the information (i.e., the test designer). This is present so the test taker will know who to respond to. The next line is a bunch of dashes for separation. The following line is a date/time stamp indicating when the message was sent. The remainder of the email message shows the actual message typed into the browser. Email messages sent always have a subject line of "Note about test . . . " to indicate that this message is from the test designer regarding a test taker. The email from line is always the email address of the test designer. This allows the test taker to respond to the test designer's email message by simply pressing the "Reply To" button in their mail program. The Message For Test Taker field is required.

Send • This button appears at the top and bottom of the test taker information. Press the Send button to send the email message to the test taker. The outcome of emailing the test taker will be displayed. If successful, the "Your Personal Test Takers" Screen will appear. If unsuccessful, a message indicating what went wrong will appear and the test designer will have the option to press the "Back Button" in the browser to try again.

Cancel • This button appears at the top and bottom of the test taker information. Press this button in order to cancel the email operation and return to the "Your Personal Test Takers" Screen.

Test Taker Information And Tests Allowed To Take (Test Taker Become) Screen

This web page appears either after logging on to the ITS as a test taker or after pressing the Become button on both the "Your Personal Test Takers" and "Test Taker View" Screens. This screen presents the information to identify the test taker and indicates which tests the test taker is assigned to take.

Test Taker Statistics Screen

This web page will appear after the test designer clicks the Statistics button on both the "Your Personal Test Takers" Screen and "Test Taker View" Screen. This page allows the test designer to view statistics about the test taker account (i.e., test score statistics and test time statistics).

Test Taker Delete Test Results Screen

This web page will appear after the test designer clicks the Delete Test Results button on the "Your Personal Test Takers" Screen. This page allows the test designer to delete the results of any tests taken by the test taker (i.e., test score statistics and test time statistics).

Cancel Outstanding Tests Screen

This web page appears after the test designer clicks the Cancel Outstanding Tests link on the top of the "Designer Information And Tests" Screen. This page allows the test designer to cancel any of the tests which any test taker presently has out. This gives the test designer the flexibility to cancel tests that are outstanding, but never submitted as well as tests that are outstanding, but which the test designer would like ended for any reason. This screen includes the following elements:

Designer Password • Enter the current designer password for security reasons. The password must match that stored in the ITS in order for tests selected to be canceled. This field is case-sensitive and required.

Enter Information Below And Press 'Erase' To Cancel SELECTED Tests (Note: all outstanding tests selected will be canceled) • Following this message, a list of tests currently being taken will be displayed in a list (scroll) box. This list will appear in the middle of the screen. Select the test(s) the test designer wishes to cancel if any (the test designer can select more than one test at a time to be canceled by holding down either the <SHIFT>, <CTRL> or <OPTION> keys when the test designer makes the selection. The key to hold down depends on the operating system the test designer is using. Refer to the operating system reference manual or web browser reference manual for more details.). The list (scroll) box contains the following information for each test currently outstanding (i.e., "handed out"):

Test Name

Test Taker Name

Test Taker Logon ID

Date And Time Last Test Part Taken Out

Using the above information, the test designer should be able to contact the test taker by looking up their contact information in the ITS.

Erase • This button appears below the list (scroll) box which shows the tests outstanding. After the test designer has entered the password, press the Erase button to cancel the test(s) that the test designer has selected from the list box, if any (a valid designer password is required). The tests selected will be canceled and a record of the status of their cancellation will be recorded in the ITS if recording results for the test. The tests canceled will not be able to be taken again unless the test taker is eligible to take the test again. The outcome of canceling the outstanding test(s) will be displayed. If successful, the "Designer Information And Tests" Screen will appear. If unsuccessful, a message indicating what went wrong will appear and the test designer will have the option to press the "Back Button" in the browser to try again.

Cancel Operation • This button appears below the list (scroll) box that shows the tests outstanding. When clicked, it exits from the operation of canceling any tests and presents the "Designer Information And Tests" Screen from which the test designer can view and change the test and test taker account information.

Test Takers Assigned to Take This Test Screen

This web page appears after the test designer clicks the Takers link to the right of the particular test that the test designer wants to either assign test taker accounts to or to view test taker account results for on the "Designer Information And Tests" Screen. This page allows the test designer to manipulate test taker information for a particular test (either by assigning test takers to take the test or by viewing the results of test takers for a test). It is the main screen used for administering and viewing information about people who can take the test. This screen includes the following elements:

Create New Assignment • This link appears near the top of the screen. When clicked on, it presents Assign Test Taker(s) To Take Your Test" Screen which allows the test designer to assign test taker accounts to take the test.

Show Designer Info • This link appears near the top of the screen. When clicked on, it presents the "Designer Information And Tests" Screen. From this screen, the test designer can manipulate the test designer information and the tests.

<TEST ID> Has X Test Takers • This message indicates the total number of test taker accounts (if any) that have been assigned to take this test. It contains a link <TEST ID> that, when clicked on, presents the "Test And Section Information" Screen. From this screen, the test designer can manipulate the test information and the sections on that test. The test taker accounts that have been assigned to take this test are listed in the list (scroll) box in between the two sets of buttons that follow. The list (scroll) box shows all of the test taker accounts that have been assigned to take the test with the following information:

TestTaker (User) Name

Test Taker Logon ID (appears in parentheses)

Total Number Of Tests Allowed To Take

URL Needed To Take Test

The 'URL Needed To Take Test' is what the test designer could put as the target of a link in an HTML page (i.e., <A HREF="URL Needed To Take Test"></A>). Doing so, gives the test to that particular test taker when the link is clicked on (or entered in the browser manually).

The buttons described below appear twice: once above the list (scroll) box showing the test taker accounts the test designer has created, and once below the list (scroll) box.

View • This button appears above and below the list (scroll) box. When clicked, it presents the "Assigned Test Taker View" Screen which allows the test designer to look at the information for a particular test assignment. This information includes the URL needed to take the test as that test taker.

Modify • This button appears above and below the list (scroll) box. When clicked, it presents the "Assigned Test Taker Modify" Screen which allows the test designer to view and change the information for a particular test assignment.

Delete • This button appears above and below the list (scroll) box. When clicked, it presents the "Assigned Test Taker Delete" Screen which allows the test designer to delete a particular test assignment (and any associated test results recorded from that taking the test as that test assignment).

Email • This button appears above and below the list (scroll) box. When clicked, it presents the "Assigned Test Taker Email" Screen which allows the test designer to send email to a particular test taker assigned to take this test (only if the test taker account has an email address). This feature allows the test designer to contact a test taker to take the test for any particular reason the test designer may have (i.e., test results, disputes, etc.).

Statistics • This button appears above and below the list (scroll) box. When clicked, it presents the "Assigned Test Taker Statistics" Screen which allows the test designer to view statistics about a particular test assignment.

Delete Test Results • This button appears above and below the list (scroll) box. When clicked, it presents the "Assigned Test Taker Delete Test Results" Screen which allows the test designer to delete all of the test results from previous tests taken as result of this assignment. To delete individual tests, refer to the "Assigned Test Taker Results" Screen which appears when manipulating test results for a particular test assignment.

Assign Test Taker(s) to Take Your Test Screen This web page appears after the test designer clicks the Create New Assignment link at the top of the "Test Takers Assigned To Take This Test" Screen and the "Assigned Test Taker View" Screen. This page allows the test designer to assign one or more test taker accounts to take the test and to set test taking requirement for those accounts. Test assignments allow a test taker to take the test. Just because the test designer has created a test taker account, doesn't mean they are automatically eligible to take the tests. The test designer must first assign them to take the test in the ITS. In this way, test takers can be assigned to take the same test multiple times or different tests without the need to re-enter their personal information. After making the assignment, that particular test taker can take the test. Assignments can be "fictitious" (template) assignments that let people take the test whom the test designer doesn't yet know about (i.e., for surveys and trivia quizzes). This screen includes the following elements:

Designer Password • Enter the current designer password for security reasons. The password must match that stored in the ITS in order for test taker account to be created. This field is case-sensitive and required.

Type Of Test Taker • Select a value from the radio buttons to make this test assignment a Regular assignment or a Template For Other Takers assignment. Tests are assigned to be taken by test takers on an individual basis. A regular assignment is one in which the test taker is assigned to take the test themselves. In contrast, a fictitious assignment can be created which allows arbitrary people to take the test (i.e., the test taker account is used as a template for others to take the test). This is necessary for coding on the Internet or to give general questionnaires whereby anyone can take the test (or anyone with the appropriate credentials and password knowledge can take the test). By filling in the other assignment fields, the test designer can control whether to require information about the person taking the test. When an account is used as a "model" and assigned as a template for other takers to take the test, the test taker account indicates the required credential information to take the test. When a test taker takes this test as the template test taker, a "new" test taker account will be created based on the template account. This "new" account will be given a default user account identifier of "_USER_N", where N is a number which will make the user logon identifier unique for the test taker account. The password and other field information for the "newly" created test taker account will vary depending on the responses to the remainder of the fields put for the assignment parameters. Refer to the fields below for more information. For example, in order to give a test to anyone, first create a test taker account to be used as a template. After doing this, assign this fictitious (default information) account to take the test as a template account. The Type Of Test Taker field is required.

Times Can Take Test (Default Value IF Type Is 'Template') (Blank=>Unlimited) • This field indicates the number of times that an account is able to take the test. If the account is assigned as a template account (see above), then this value represents the number of times the "new" account being created is allowed to take the test. Valid values are greater than or equal to zero and blank. Blank values imply that the test taker can take this test an unlimited number of times. Zero indicates that this test can't be taken any times (maybe used to stop new tests from being issued). This field is not required.

Times Can Create New Taker (Only Valid IF Type Is 'Template') (Blank=>Unlimited) This field indicates the number of times that a new taker account will be created if the type of assignment is template (Template For Other Takers). This indicates how many "new" test taker accounts (i.e., how many times this test can be taken by others) will be allowed. Valid values are greater than or equal to zero and blank. Blank values imply that an unlimited number of test taker can take this test (for the above number of times each). Zero indicates that no new test taker accounts will be created (maybe used to prevent new tests from being issued). This field is not required for regular account assignments and is required for template account assignments.

Dates Can Take Test (MM/DD/YYYY HH:MM PM) (Blanks Mean No Limit): (From) (To) • These fields indicate a range of dates and times between which the test can be taken (from the "From" value to the "To" value). Only during this period of time will the ITS give out this test to the test taker account. The format of the field is MM/DD/YYYY HH:MM PM, where:

MM represents the month expressed as two digits (01–12)

DD represents the day of the month expressed as two digits (01–31, depending on the actual month)

YYYY represents the years expressed as four digits (1997)

HH represents the hour of the day expressed as two digits (01–12)

MM represents the minute of the hour expressed as two digits (00–59)

PM represents either AM or PM depending on the part of the day to give the test

Blanks imply that there is no limit. If the "From" field is blank, it means that there is no lower limit on the date and time this test will be given. If the "To" field is blank, it means that there is no upper limit on the date and time this test must be taken. If both fields are blank, this test can be given at any time. The "From" date and time must be less than or equal to the "To" date and time. These fields are not required.

Level Of Test Results To Record • This field represents the degree of test result recording the test designer wishes for this test assignment. When a test is given, results can be recorded for the test. The amount of recording is determined by the value in this field. After a test has been given, test results can be viewed based on the level of recording:

None

Test

Test and Section

Test, Section and Question ("All" or "Playback")

'None' indicates that no level of recording test results should take place. This means that no information about the test (grades or times) are recorded after a test has been given and no results can be looked at later. It takes up the least amount of room in the ITS database and is used as a means to give tests for the test taker's instructional purposes only (when no feedback is required by the test designer).

'Test' indicates that only test results should be recorded for the test:

Date Out

Date In

Score

Status

This recording level can be used to later compute test statistics (score and test time: mean, standard deviation, min, max, mode, etc.) for the test. It can also be used to generate distributions, histograms and plots. The status of a test indicates what the outcome of giving a test was (i.e., Is it still being taken? Did the test taker complete it successfully? Did the test taker quit? Did the test-taker try to change an answer and the system terminated the test? Etc.). The 'Test' level of recording results is good for computing grades and test times. It doesn't record any detailed information about the test and cannot replay a test later. This recording level takes more room than recording no information ('None'), but not as much as that required for recording 'Test and Section' information in the ITS. It is intermediate in the amount of room it takes up and is recommended when no playback of tests is required.

'Test and Section' indicates that the above test results should be recorded ('Test') as well as section results. For each section given, the following information is recorded:

Section Order Number

Number Questions Answered Correctly

Number Questions Answered Incorrectly

Number Questions Not Answered

The "Raw" Score For The Section

Time Spent In The Section (Average Value If More Than One Section On A Part)

Time Spent After The Section Pausing (If Any)

Number Of Visits To The Section

Number Of Visits To The Pause After The Section (If Any)

In addition to the what the 'Test' level of recording can generate, this recording level can be used to later compute section statistics (score, time and visit) for the test. It can also be used to generate distributions, histograms and plots for the individual sections and parts for a test. The section order number indicates what order the sections were actually given to the test taker. The number of questions answered correctly, incorrectly or not answered indicates the basic statistics for a section.

The "Raw" score for a section indicates the actual point value (before weighting) that the test taker got on this section. This is the sum of the individual question-point values. The time spent in the section indicates the number of minutes spent in the section (if more than one section make up a test part, this number indicates the number of average minutes spent in the section . . . the sum of the average number of minutes spent in all the sections on the test part will total the number of minutes spent on the test part). The time spent after the section pausing indicates the number of minutes that the test taker spent pausing after the section (if any).

The number of visits to a section indicates the number of times a test taker went to the test part that contained this section. The number of visits to the pause following a section indicates the number of times a test taker went to the pause following this section (if any).

The 'Test and Section' level of recording results is good for the same things as the 'Test' recording level plus having the ability to compute section statistics and recreating the outline of the test that was taken later (i.e., what parts were on the test). It doesn't record any detailed information about the questions and cannot replay the exact same test later. This recording level takes more room than recording 'Test' information, but not as much as that required for recording 'Test, Section and Question' information in the ITS. It is intermediate in the amount of room it takes up and is recommended when section information is required, but no question information is needed.

'Test, Section and Question ("All" or "Playback")' indicates that the above 'Test and Section' results should be recorded as well as the following question results:

Question Order Number

Answer(s)

Points

Question Results

In addition to the what the 'Test and Section' level of recording generates, this recording level can be used to later compute question statistics (averages and means for number right, wrong, no answer, and points) for the test. It can also be used to generate distributions, histograms and plots for the individual questions and choices for a test. The question order number indicates what order the questions were actually given in within the section to the test taker. This is used to later "Play Back" the test to the test taker or test designer. The answer(s) to the test question are recorded as well for each question. The points awarded for a question indicate the number of points the test taker was awarded for that question. The question results indicate one of the following:

No Answer Was Put For The Question

Right Answer Was Put For The Question

Wrong Answer Was Put For The Question

Bad/Unknown Answer Was Put For Question

The 'Test, Section and Question' level of recording results is good for the same things as the 'Test and Section' recording level plus having the ability to compute question statistics and recreating (i.e., "playing back") the test that was taken (i.e., what parts, questions and answers were put on the test). It records detailed information about the questions and can replay the exact same test later. This recording level takes more room than any other level of recording in the ITS. It should be used when recreating the same test at a later date is needed or when test question statistics are needed. The Level Of Test Results To Record field is required.

Assign One Or More Eligible Test Takers To Take Your Test • This list (scroll) box shows the test taker accounts that are eligible to take the test. A test account is eligible to take the test when it has been created by that person (i.e., the test designer) or a test administrator. For each test taker account allowed to take the test, the following information appears in the list (scroll) box:

User (Test Taker) Name

Logon ID

Maximum Number Of Tests Allowed

By selecting values in this list (scroll) box, the test designer is telling the ITS which test taker account(s) the test designer wishes to assign to take the test. The test designer can select multiple test taker accounts at once by holding down the appropriate key and selecting multiple test taker accounts from the list (scroll) box with the mouse (refer to the web browser reference manual or operating system manual for more information on how to select multiple entries in a list or scroll box). This field is required (the test designer must assign at least one test taker account to take the test).

Test Taking Information • This phrase indicates that a table showing what fields of the test taker's personal information are either required, verified or replaced when this test taker attempts to take this test follows. The table is split into four columns. The first column lists the field which the other three columns of information pertain to. This column is labeled "Affected Field". It has no input and is just for displaying the test taker field name:

Taker Logon ED
Password
Name
Phone Number
E-Mail Address
Address, Line #1
Address, Line #2
city
State
Zipcode
Fax Number The second column is a set of check boxes. These check boxes determine what fields of information (if any) the test taker is required to enter when they go to take the test. If a check box is checked, the test taker will be prompted to enter a value for the field listed in the first column described above before they are given the test. If the check box is not checked, the test taker will not be prompted for this field when they go to take the test. This column is labeled "When Test Taker Takes Test Fields Are Required". The default value for all of the fields except for the Taker Logon ID and the Password fields is not checked. The default value for the Taker Logon ID and the Password fields is checked. This means that the test taker will be prompted to enter values for their logon identification and password when they go to take the test. These fields are required.

The third column is also a set of check boxes. These check boxes determine what fields (if any) are verified when a test taker attempts to take a test. If a check box is checked, the values that the test taker enters are checked against the current values stored in the ITS. The entries must match (the matches are case insensitive except for password) in order for the test to be given. Note that the fields that are to be verified must be required as well (if they are to be verified) or else the verification will fail. Refer to the above discussion for more information on the required check box. This column is labeled "When Test Taker Takes Test Fields Are Verified". The default value for all of the fields except for the Taker Logon ID and the Password fields is not checked. the default value for the Taker Logon ID and the Password fields is checked. This means that the test taker logon identification and password entered will first be verified with the logon identification and password stored in the ITS. If a match is found, then the test will be given. The 'Test Designer Password' and the 'Test Administrator Password' will also be accepted for the Password field. These fields are required.

The fourth column is a set of check boxes. These check boxes determine what fields (if any) are replaced when a test taker attempts to take a test. If a check box is checked, the values that the test taker enters will replace the current values stored in the ITS (after first being verified with the current information if required). This is useful to gather information about the test taker (i.e., name, address, phone number, etc.). Note that the fields that are to be replaced must be required as well (if they are to be replaced) or else the replacement will not occur. Refer to the above discussion for more information on the required check box. This column is labeled "When Test Taker Takes Test Fields Are Replaced". The default value for all of the fields is not checked. This means that the test taker logon identification and password entered will not replace the current information stored in the ITS. These fields are required.

Assign • This button appears at the top and bottom of the field information for the screen. After the test designer has entered the required information above, press this button to assign the test taker account(s) to take the test. The results of adding a new test taker account assignment will be displayed. If successful, the "Test Takers Assigned To Take This Test" Screen will appear listing the newly assigned test taker account. Also, a message showing the URL to use in order to take the test as the assigned test taker will appear. This message takes the form of:

<A HREF="http://<machine>/<TEST ID>?ut_id=
<ASSIGNMENT ID#>">

(Note: the URL portion is everything in quotation marks) where:

| | |
|---|---|
| http: | represents the protocol, |
| <machine> | represents the machine name |
| <TEST ID> | represents the test identification name |
| <ASSIGNMENT ID#> | represents the test taker account assignment identification | number determined by the ITS.

if unsuccessful, a message indicating what went wrong will appear and the test designer will have the option to press the "Back Button" in the browser to try again.

Erase Values • Press this button in order to discard the entries and start over.

Assigned Test Taker View Screen

This web page appears after the test designer clicks the view button on the "Test Takers Assigned To Take This Test" Screen. This page allows the test designer to view the information for a test taker account assignment. Test taker account assignments allow a test taker to take the test. Just because the test designer has created a test taker account, doesn't mean they are automatically eligible to take the tests. The test designer must first assign them to take the test in the ITS. In this way, test takers can be assigned to take the same test multiple times or different tests without the need to re-enter their personal information. After making the assignment, that particular test taker can take the test. Assignments can be "fictitious" (template) assignments that let people take the test that the test designer doesn't yet know about (i.e., for surveys and trivia quizzes). Refer to the "Assign Test Taker(s) To Take Your Test" Screen and the "Create A New Test Taker" Screen for a description of the fields of information which are listed on this screen. Only the fields that are different than those described in the referenced screens and the buttons and links which appear on this screen are described below. This screen includes the following elements:

Create New Assignment • This link appears near the top of the screen. When clicked on, it presents Assign Test Taker(s) To Take Your Test" Screen which allows the test designer to assign test taker accounts to take the test.

Show Designer Info • This link appears near the top of the screen. When clicked on, it presents the "Designer Information And Tests" Screen. From this screen, the test designer can manipulate the test designer information and the tests.

Show Test Assignments • This link appears near the top of the screen. When clicked on, it presents the "Test Takers Assigned To Take This Test" Screen. From this screen, the test designer can manipulate the test taker account assignments.

URL To Take Test <A HREF="http://<machine>/<TEST ID>?ut_id=<ASSIGNMENT ID#>"> • This message indicates the HTML code needed to embed a hyper-text link in an HTML document (the actual format would be: <A . . . > Some Text</A>). The URL portion of the above line is everything in quotation marks, starting with http://. If the URL is entered in a standard web browser, the test will be given to the browser. The URL consists of the following parts:

| | |
|---|---|
| http: | represents the protocol |
| <machine> | represents the machine name |
| <TEST ID> | represents the test identification name |
| <ASSIGNMENT ID#> | represents the test taker account assignment identification | number determined by the ITS.

Following this message are fields of information about the test taker account assignment:
  Type Of Test Taker
  Times Can Take Test (Default Value IF Type Is 'Template')
  Times Can Create New Taker (Only Valid IF Type Is 'Template')
  Dates Can Take Test (MM/DD/YYYY HH:MM PM): (From) and (To)
  Level Of Test Results To Record
  Test Taker Information:
  Logon ID
  Name
  Maximum Number Of Tests
  Skeleton File When Log On (Contains <!—<TEST>—> Tag)
  Phone Number
  E-Mail Address
  Address, Line #1
  Address, Line #2
  City
  State
  Zipcode
  Fax Number
  Test Taker Logon And Test Taking Information:
  Whether Fields Above Are Viewable When Test Taker Logs On To ITS
  Whether Fields Above Are Modifiable By Test Taker When Test Taker Logs On To ITS
  Whether Fields Above Are Required When Test Taker Attempts To Take Test
  Whether Fields Above Are Verified When Test Taker Attempts To Take Test
  Whether Fields Above Are Replaced When Test Taker Attempts To Take Test Modify • This button appears above and below the test taker assignment information. When clicked, it presents the "Assigned Test Taker Modify" Screen which allows the test designer to view and change the information for a particular test taker account assignment.

Delete • This button appears above and below the test taker assignment information. When clicked, it presents the "Assigned Test Taker Delete" Screen which allows the test designer to delete this particular test taker's account assignment (and any associated test results for that assignment).

Email • This button appears above and below the test taker assignment information. When clicked, it presents the "Assigned Test Taker Email" Screen which allows the test designer to send email to this particular test taker account that is assigned to take the test (only if this test taker has an email address). This feature allows the test designer to contact this test taker for any particular reason the test designer may have (i.e., test results, disputes, etc.).

Statistics • This button appears above and below the test taker assignment information. When clicked, it presents the "Assigned Test Taker Statistics" Screen which allows the test designer to view statistics about this particular test taker's account assignment.

Assigned Test Taker Modify Screen

This web page appears after the test designer clicks the Modify button on both the "Test Takers Assigned To Take This Test" Screen and "Assigned Test Taker View" Screen. This page allows the test designer to modify the test taker account assignment information by specifying different parameters for the test taker account. It contains the exact same fields as described in the "Assign Test Taker(s) To Take Your Test" Screen. We will only describe any differences between the fields, links and buttons between the two screens. This screen includes the following elements:

Show Designer Info • This link appears near the top of the screen. When clicked on, it presents the "Designer Information And Tests" Screen. From this screen, the test designer can manipulate the test designer information and the tests.

Show Test Assignments—This link appears near the top of the screen. When clicked on, it presents the "Test Takers Assigned To Take This Test" Screen. From this screen, the test designer can manipulate the test taker account assignments.

Designer Password • Enter the current designer password for security reasons. The password must match that stored in the ITS in order for test taker account assignment to be modified. This field is case-sensitive and required.

URL To Take Test <A HREF="http://<machine>/<TEST ID>?ut_id=<ASSIGNMENT ID#>"> • This message indicates the HTML code needed to embed a hypertext link in an HTML document (the actual format would be: <A . . . > Some Text</A>). The URL portion of the above line is everything in quotation marks, starting with http://. If the URL is entered in a standard web browser, the test will be given to the browser. The URL consists of the following parts:

| | |
|---|---|
| http: | represents the protocol |
| <machine> | represents the machine name |
| <TEST ID> | represents the test identification name |
| <ASSIGNMENT ID#> | represents the test taker account assignment identification | number determined by the ITS.

Following this message are fields of information about the test taker account assignment:
  Type Of Test Taker
  Times Can Take Test (Default Value IF Type Is 'Template')
  Times Can Create New Taker (Only Valid IF Type Is 'Template')
  Dates Can Take Test (MM/DD/YYYY HH:MM PM): (From) and (To)

Level Of Test Results To Record
Test Taker Information:
Logon ID
Name
Maximum Number Of Tests
Skeleton File When Log On (Contains <!—<TEST>—> Tag)
Phone Number
E-Mail Address
Address, Line #1
Address, Line #2
City
State
Zipcode
Fax Number
Test Taking Information:
Whether Fields Above Are Required When Test Taker Attempts To Take Test
Whether Fields Above Are Verified When Test Taker Attempts To Take Test
Whether Fields Above Are Replaced When Test Taker Attempts To Take Test Modify • This button appears at the top and bottom of the field information for the test taker account assignment. After the test designer has modified the required test taker account assignment information, press the Modify button to modify the test taker account assignment parameters (a valid designer password is required). The results of modifying the test taker account assignment will be displayed. If successful, the "Test Takers Assigned To Take This Test" Screen will appear, showing the test taker account assignment with the changes. If unsuccessful, a message indicating what went wrong will appear and the test designer will have the option to press the "Back Button" in the browser to try again.

Reset Values • This button appears at the top and bottom of the field information for the test taker account assignment. Press this button in order to reset the entries to their previous values and start again.

Assigned Test Taker Delete Screen

This web page appears after the test designer clicks the Delete button on both the "Test Takers Assigned To Take This Test" Screen and "Assigned Test Taker View" Screen. This page allows the test designer to delete the test taker account assignment. All the test taker account assignment information as well as all the test results for that test taker account assignment will be removed. This screen includes the following elements. Refer to the "Assign Test Taker(s) To Take Your Test" Screen and to the "Create A New Test Taker" Screen for a list of fields and their meaning Show Designer Info • This link appears near the top of the screen. When clicked on, it presents the "Designer Information And Tests" Screen. From this screen, the test designer can manipulate the test designer information and the tests.

Show Test Assignments • This link appears near the top of the screen. When clicked on, it presents the "Test Takers Assigned To Take This Test" Screen. From this screen, the test designer can manipulate the test taker account assignments.

Designer Password • Enter the current designer password for security reasons. The password must match that stored in the ITS in order for test taker account assignment to be modified. This field is case-sensitive and required.

URL To Take Test <A HREF="http://<machine>/<TEST ID>?ut_id=<ASSIGNMENT ID#>"> • This message indicates the HTML code needed to embed a hyper-text link in an HTML document (the actual format would be: <A . . . > Some Text</A>). The URL portion of the above line is everything in quotation marks, starting with http://. If the URL is entered in a standard web browser, the test will be given to the browser. The URL consists of the following parts:

| | |
|---|---|
| http: | represents the protocol |
| <machine> | represents the machine name |
| <TEST ID> | represents the test identification name |
| <ASSIGNMENT ID#> | represents the test taker account assignment identification | number determined by the ITS.

Following this message are fields of information about the test taker account assignment:
Type Of Test Taker
Times Can Take Test (Default Value IF Type Is 'Template')
Times Can Create New Taker (Only Valid IF Type Is 'Template')
Dates Can Take Test (MM/DD/YYYY HH:MM PM): (From) and (To)
Level Of Test Results To Record
Test Taker Information:
Logon ID
Name
Maximum Number Of Tests
Skeleton File When Log On (Contains <!—<TEST>—> Tag)
Phone Number
E-Mail Address
Address, Line #1
Address, Line #2
City
State
Zipcode
Fax Number
Test Taking Information:
Whether Fields Above Are Required When Test Taker Attempts To Take Test
Whether Fields Above Are Verified When Test Taker Attempts To Take Test
Whether Fields Above Are Replaced When Test Taker Attempts To Take Test Unassign • This button appears at the top and bottom of the test taker assignment information. After the test designer has entered the password, press the Delete button to delete the test taker account assignment (a valid designer password is required). The test taker account assignment and all associated information including any test results will be removed. The outcome of deleting the test taker account assignment will be displayed. If successful, the "Test Takers Assigned To Take This Test" Screen will appear, showing that the test taker account assignment has been removed. If unsuccessful, a message indicating what went wrong will appear and the test designer will have the option to press the "Back Button" in the browser to try again.

Cancel • This button appears at the top and bottom of the test taker assignment information. Press this button in order to cancel the delete operation and return to the "Test Takers Assigned To Take This Test" Screen.

Assigned Test Taker Email Screen

This web page appears after the test designer clicks the Email button on both the "Test Takers Assigned To Take This Test" Screen and "Assigned Test Taker View" Screen. This page allows the test designer to send email to the assigned test taker. No password is required. This screen includes the following elements. Refer to the "Assign Test Taker(s) To Take Your Test" Screen and to the "Create A New Test Taker" Screen for a list of fields and their meaning.

Show Designer Info • This link appears near the top of the screen. When clicked on, it presents the "Designer Information And Tests" Screen. From this screen, the test designer can manipulate the test designer information and the tests.

Show Test Assignments • This link appears near the top of the screen. When clicked on, it presents the "Test Takers Assigned To Take This Test" Screen. From this screen, the test designer can manipulate the test taker account assignments.

Enter The Information In The Form Below And Then Send The Email To The Test Taker By Pressing 'Send' • This message indicates what to do in order to send email to the test taker. Following this message, the test taker account information, test URL and test name are displayed for reference:

URL To Take Test
Logon ID
Name
Phone Number
E-Mail address
Address,Line #1
Address, Line #2
City
State
Zipcode
Fax Number
Test Name Message For Test Taker • This field indicates the email message the test designer wishes send to the test taker. It can be anything the test designer desires and is required (why else send a message if the test designer doesn't have a message to send?). By default, the following is always included in the message:

Message From <Test Designer Name> (Email: <Test Designer Email Address>)
Date/Time Of Message: Jan. 11, 1997 9:57:36 AM
Message:
    <Message Content>

The first line indicates the information (i.e., the test designer). This is present so the test taker will know who to respond to. The next line is a bunch of dashes for separation. The following line is a date/time stamp indicating when the message was sent. The remainder of the email message shows the actual message typed into the browser. Email messages sent always have a subject line of "Note about test . . . " to indicate that this message is from the test designer regarding a test taker account assignment. The email from line is always the email address of the test designer. This allows the test taker to respond to the test designer's email message by simply pressing the "Reply To" button in their mail program. The Message For Test Taker field is required.

Send • This button appears at the top and bottom of the test taker and test assignment information. Press the Send button to send the email message to the test taker. The outcome of emailing the test taker will be displayed. If successful, the "Test Takers Assigned To Take This Test" Screen will appear. If unsuccessful, a message indicating what went wrong will appear and the test designer will have the option to press the "Back Button" in the browser to try again.

Cancel • This button appears at the top and bottom of the test taker and test assignment information. Press this button in order to cancel the email operation and return to the "Test Takers Assigned To Take This Test" Screen.

Assigned Test Taker Statistics Screen

This web page will appear after the test designer clicks the Statistics button on both the "Test Takers Assigned To Take This Test" Screen and "Assigned Test Taker View" Screen. This page allows the test designer to view statistics about the test taker account assignment (i.e., test score statistics and test time statistics).

Assigned Test Taker Delete Test Results Screen

This web page will appear after the test designer clicks the Delete Test Results button on the "Test Takers Assigned To Take This Test" Screen. This page allows the test designer to delete the results of any tests taken by the test taker account assignment (i.e., test score statistics and test time statistics).

Glossary of Terms and Meanings

| | |
|---|---|
| Account | The information about a test designer, administrator or taker. |
| Answer | The correct choice(s). |
| Assignment | The process of assigning a test taker to take a test. |
| Break (Pause) | A special part of a test which allows for an amount of time which serves as a rest for the test taker. Breaks (if any) are determined by the section which precedes them and can be entertaining (a game), amusing (a video clip) or simple (nothing fancy). |
| Choice | The selections available for a question. |
| Distribution | A plot showing how the values are distributed. |
| Eligibility | The state of a test taker account that determines whether a person is allowed to take the test. |
| Grade | The numerical or letter value assigned to a person for a course. Grades are based on the combination of the scores for a series of tests. |
| Highest (Maximum Value) | The largest value in a group of numbers. |

-continued

| | |
|---|---|
| HTML | The "source" code used in a web browser. This is the actual text which controls what will appear in the web browser. By coding questions, answers and choices using HTML tags, the test designer can create dynamic and interesting questions. |
| Internet | The network of computers (all over the world) connected via a set of communication links. The computers communicate with each other by a set of protocols or rules. |
| Intranet | The network of computers (within an organization) connected via a set of communication links. The computers communicate with each other by a set of protocols or rules. |
| ITS | Interactive Testing and Questionnaire System (also known as the 'Internet Testing System). This is the program that allows for the development of tests and questionnaires on the Internet and Intranet. |
| Lowest (Minimum Value) | The smallest value in a group of numbers. |
| Mean (Average) | The average value of a group of numbers. For example, if the test designer has four numbers: 1, 10, 12, and 1000. The mean (average) value would be 255.75 (=(1 + 10 + 12 + 1000)/4). The mean is computed as follows:<br>Mean ($\underline{X}$) = Sum($X_i$)/N, where $X_i$ is a value<br>N is the number of scores (i = 1. . . N) |
| Mean (Average) | The average value of a group of numbers. For example, if the test designer has four numbers: 1, 10, 12, and 1000. The mean (average) value would be 255.75 (=(1 + 10 + 12 + 1000)/4). The mean is computed as follows:<br>Mean ($\underline{X}$) = Sum($X_i$)/N, where $X_i$ is a value<br>N is the number of scores (i = 1 . . N) |
| Median | The 'middle' value of a group of numbers. It is the value above and below which one half of the observations fall. For example, if the test designer has four numbers: 1, 10, 12, and 1000. The median value would be 11 (the two middle values averaged together (10 + 12)/2)). |
| Mode | The most common (or popular) value(s) in a group of numbers. The mode is the most frequently occurring value (or values). |
| Part | A logical subdivision of a test. Each part of a test is given on one page (screen) of a standard web browser and represents a logical grouping of one or more sections. There are no physical test parts (i.e., test parts don't exist). Instead, the sections of which they are composed determine test parts. |
| Plot | A graphical display of values. Plots can take on many forms. |
| Question | The basic unit of a test. Questions are what physically appear on a test. Questions make up a section which, in turn, determines the structure of a test (i.e., indicates the test parts). |
| Range | The values between two numbers. |
| Results | The outcome of a test. This includes the answers placed on the test(s) while taking the test and whether the answer was correct or incorrect. |
| Root Mean Square (RMS) Value | The value computed using the formula:<br>Square Root Of (Sum(X,2/N)), where<br>$X_i$ represents a value<br>N represents the number of values (i = 1 . . N) |
| Score | The results (outcome) of a test. Scores are between a range of values and indicate how well a person has mastered the material presented on the test. |
| Section | A group of related questions. A section is the fundamental physical building block of a test. Sections determine the structure of the parts on a test. They allow the test designer to control the format and layout of a test (i.e., they determine the parts on a test). |
| Standard Deviation | The "average" value around the mean:<br><br>Standard Deviation (S) Square Root ($S^2$),where:<br>S2 represents the variance |
| Standard Score ("Z" Score) | The number of standard deviations above or below the mean a value falls:<br>Standard Score ($Z_i$) = ($X_i \cdot \underline{X}$)/S, where:<br>$X_i$ represents a value<br>$\underline{X}$ represents the mean of the values<br>S represents the standard deviation of the values<br>The average value of the standard score is always zero. The standard deviation of the standard score is always one. Standard scores allow the test designer to compare different measurements on the same basis. |
| Statistics | Numbers which give indications about certain aspects of a test. Statistics include mean, median, standard deviation, maximum and minimum values. |
| Test | A sequence of questions about a particular topic of interest. |
| Test Administrator | The person who administers test designer accounts and is responsible for the over-all setup and functionality of the ITS. |

-continued

| | |
|---|---|
| Test Designer | The person responsible for making up tests and assigning people to take them. |
| Test Part | One or more sections which are asked at the same time on one page of a Web browser. There can be one or more sections within a test part. |
| Test Section | A test section contains zero or more questions and can be followed by:<br>An optional break or pause given on a separate page in the browser<br>Another section given on the same page (at the same time) in the browser<br>Test Part: Section → [Optional Break] → Section → [Optional Break] →... |
| Test Question | The basic unit of a test. Used to extract information from a test taker. |
| Test Score | A grade given based on the answer(s) put to various questions on a test. |
| Test Taker | The person who takes the test. |
| Test Centric Learning | The concept where a test taker is first given the questions at the end of a chapter in a text book and then reads about how to answer the question by clicking on a link embedded in the question. This has the effect of motivating the student or test taker to learn about the subject matter of the question before reading the material. Test takers who already know about the information can simply answer the question directly. |
| URL | Universal Resource Locator. A reference to a resource on the web. It consists of a protocol, a machine name (or IP address), a port number and a resource identifier:<br><protocol>://<machine>[:<port>]/<resource identifier><br>An example would be:<br>http://www.testsonline.com/80/index.html |
| Variance | The squared standard deviation around the average value (mean). It is defined as follows:<br>Variance $(S^2)$ = Sum$((X_i - \underline{X})^2)/(N - 1)$, where:<br>$X_i$ represents a value (i.e., Score, Time, etc.)<br>$\underline{X}$ represents the average of all the values (mean)<br>N represents the number of values |

It should be understood that the preferred embodiments and examples described herein are for illustrative purposes only and are not to be construed as limiting the scope of the present invention, which is properly delineated only in the appended claims.

What is claimed is:

1. A human response testing system, comprising:
   (a) a host, storing a plurality of testing parameters, said testing parameters being divided into a plurality of sections;
   (b) a terminal, communicating with said host through a telecommunications link, adapted for interaction with the human to acquire responses,
   wherein said host transmits information defining one of said sections to said terminal, including designated queries and context information, and defines information representative of a state of said section before transmission, said terminal presents inquiries to the human defined by said section for receipt of responses to said queries and said terminal transmits an answer including information relating to said responses and a modified state to said host, said host processing said responses to determine an information content and determining a change between said defined state and said modified state to indicate changes between said transmitted context information and said information relating to said responses.

* * * * *